(12) United States Patent
Caceres et al.

(10) Patent No.: US 7,228,566 B2
(45) Date of Patent: Jun. 5, 2007

(54) AUTOMATED COMPUTER SYSTEM SECURITY COMPROMISE

(75) Inventors: Maximiliano Gerardo Caceres, Cuidad Autonoma de Buenos Aires (AR); Gerardo Gabriel Richarte, Cuidad Autonoma de Buenos Aires (AR); Agustin Azubel Friedman, Cuidad Autonoma de Buenos Aires (AR); Ricardo Quesada, Cuidad Autonoma de Buenos Aires (AR); Luciano Notarfrancesco, Cuidad Autonoma de Buenos Aires (AR); Oliver Friederichs, Menlo Park, CA (US); Javier Burroni, Cuidad Autonoma de Buenos Aires (AR); Gustavo Ajzenman, Cuidad Autonoma de Buenos Aires (AR); Gabriel Becedillas, Cuidad Autonoma de Buenos Aires (AR); Bruce Leidl, Cuidad Autonoma de Buenos Aires (AR)

(73) Assignee: Core SDI, Incorporated, Boston, MA (US)

( * ) Notice: Subject to any disclaimer, the term of this patent is extended or adjusted under 35 U.S.C. 154(b) by 805 days.

(21) Appl. No.: 10/054,307

(22) Filed: Jan. 22, 2002

(65) Prior Publication Data
US 2003/0014669 A1 Jan. 16, 2003

Related U.S. Application Data

(60) Provisional application No. 60/313,793, filed on Aug. 20, 2001, provisional application No. 60/304,270, filed on Jul. 10, 2001.

(51) Int. Cl.
*H04L 9/00* (2006.01)

(52) U.S. Cl. .................. 726/25; 726/22; 709/202; 709/203; 709/219; 707/10

(58) Field of Classification Search ............ None
See application file for complete search history.

(56) References Cited

U.S. PATENT DOCUMENTS 5,485,409 A * 1/1996 Gupta et al. ............... 726/25

(Continued)

FOREIGN PATENT DOCUMENTS

| WO | WO 99/66383 | 12/1999 |
|----|----|----|
| WO | 0038036 A2 | 6/2000 |
| WO | WO 01/33353 A2 | 5/2001 |

OTHER PUBLICATIONS

Stone, Martin, "Attack Agents Found On 3 Computers", Daily News-Newsbytes, Feb. 15, 2000, entire document, URL: http://www.computeruser.com/news/00/02/15/news1.html.*

(Continued)

*Primary Examiner*—Nasser Moazzami
*Assistant Examiner*—Ronald Baum
(74) *Attorney, Agent, or Firm*—Sheehan, Phinney, Bass & Green, PA; Peter A. Nieves

(57) ABSTRACT

A system is provided for performing penetration testing of a target computer network by installing a remote agent in the target computer network. The system includes a local agent provided in a computer console and configured to receive and execute commands. A user interface is provided in the console and configured to send commands to and receive information from the local agent, process the information, and present the processed information. A database is configured to store the information received from the local agent. A network interface is connected to the local agent and configured to communicate with the remote agent installed in the target computer network via a network. Security vulnerability exploitation modules are provided for execution by the local agent and/or the remote agent.

14 Claims, 22 Drawing Sheets

U.S. PATENT DOCUMENTS

| | | | | |
|---|---|---|---|---|
| 5,600,790 | A | 2/1997 | Barnstijn et al. | 395/183.14 |
| 5,812,529 | A | 9/1998 | Czarnik et al. | 370/245 |
| 5,961,644 | A | 10/1999 | Kurtzberg et al. | 713/200 |
| 6,009,456 | A | 12/1999 | Frew et al. | 709/202 |
| 6,070,244 | A | 5/2000 | Orchier et al. | 713/201 |
| 6,081,665 | A | 6/2000 | Nilsen et al. | 395/705 |
| 6,085,243 | A | 7/2000 | Fletcher et al. | |
| 6,108,715 | A | 8/2000 | Leach et al. | 709/330 |
| 6,125,390 | A | 9/2000 | Touboul | 709/223 |
| 6,137,782 | A | 10/2000 | Sharon et al. | 370/255 |
| 6,185,689 | B1 | 2/2001 | Todd, Sr. et al. | 713/201 |
| 6,202,199 | B1 | 3/2001 | Wygodny et al. | 717/4 |
| 6,205,122 | B1 | 3/2001 | Sharon et al. | 370/254 |
| 6,205,551 | B1 | 3/2001 | Grosse | 713/201 |
| 6,205,552 | B1 | 3/2001 | Fudge | 713/201 |
| 6,249,886 | B1 | 6/2001 | Kalkunte | 714/47 |
| 6,286,047 | B1 | 9/2001 | Ramanathan et al. | 709/224 |
| 6,298,445 | B1 | 10/2001 | Shostack et al. | 713/201 |
| 6,301,668 | B1 | 10/2001 | Gleichauf et al. | 713/201 |
| 6,408,391 | B1 | 6/2002 | Huff et al. | 713/201 |
| 6,574,737 | B1 * | 6/2003 | Kingsford et al. | 726/25 |
| 7,107,347 | B1 * | 9/2006 | Cohen | 709/229 |
| 2003/0149741 | A1 | 8/2003 | Krooss | 709/217 |

OTHER PUBLICATIONS

Kargl, Frank, et al, "Protecting Web Servers from Distributed Denial of Service Attacks", Univ. of Ulm, May 1, 2001, entire document, http://www.10.org/cdrom/papers/409/.*

Melbourne, J., et al, 'Penetration Testing for Web Applications (Part One)', SecurityFocus, Jun. 16, 2003, entire document, http://www.securityfocus.com/infocus/1704.*

Melbourne, J., et al, 'Penetration Testing for Web Applications (Part Two)', SecurityFocus, Jul. 3, 2003, entire document, http://www.securityfocus.com/infocus/1709.*

Melbourne, J., et al, 'Penetration Testing for Web Applications (Part Three)', SecurityFocus, Aug. 20, 2003, entire document, http://www.securityfocus.com/infocus/1722.*

Andrew J. Stewart., "Distributed Metastasis: A Computer Network Penetration Methodology," [online] Aug. 12, 1999, XP-002325346. Retrieved from the Internet: <URL: http://www.csee.umbc.edu/cadip/docs/NetworkIntrusion/distributed_metastasis.pdf> [retrieved on Apr. 19, 2005].

Jeffrey W. Humphries, Curtis A. Carver, Jr., Udo W. Pooch: "Secure Mobile Agents for Network Vulnerability Scanning," Proceedings of the 2000 IEEE Workshop on Information Assurance and Security, [online] Jun. 6, 2000, XP002325347. United States Military Academy, West Point, NY. Retrieved from the Internet: <URL: http//www.itoc.usma.edu/marin/Wshop/Papers2000/TA1_4.pdf> [retrieved on Apr. 19, 2005].

Anomyme, "Securite Optimate—Seconde Edition," Sep. 28, 1999, Campuspress, XP-002325348 (Machine Translated Abstract provided herewith).

Dan Farmer et al.; "Improving the Security of Your Site by Breaking Into it"; Sun Microsystems, Eindhoven University of Technology; http://www.fish.com/security/admin-guide-to-cracking.html., 1993.

\* cited by examiner

AUTOMATED COMPUTER SYSTEM SECURITY COMPROMISE

This application claims the benefit of U.S. Provisional Application No. 60/304,270, filed Jul. 10, 2001, and U.S. Provisional Application No. 60/313,793, filed Aug. 20, 2001.

BACKGROUND OF THE INVENTION

1. Field of the Invention

The present invention relates generally to analyzing computer system security by compromising the security in a systematic manner.

2. Related Art

Computer systems that are connected to a computer network, such as the Internet, must employ security measures to prevent unauthorized users from accessing these systems. The security measures must be properly designed and implemented in order to prevent unauthorized access. However, it is difficult to evaluate the effectiveness of such security measures, particularly in view of the increasing sophistication of techniques used to gain unauthorized access to computer systems.

The effectiveness of the security measures of a computer system may be evaluated by performing a computer security audit in which various aspects of computer security are analyzed and evaluated. The security audit may include a penetration test, which is a process by which a security auditor attempts to gain unauthorized access to the computer system.

Conventionally, a penetration test is performed using a multitude of ad hoc methods and tools, rather than according to a formalized standard or procedure. A typical penetration test includes the following stages:

1. Information gathering: The security auditor gathers technical details about the target system and information regarding the owner of the target system.
2. Information analysis and planning: The auditor analyzes the information to plan an overall approach by which to perform the penetration testing. This tends to be a difficult and time consuming task and requires experienced and knowledgeable personnel having a highly specialized skill base.
3. Vulnerability detection: The auditor searches the target system for security vulnerabilities based on the top-level plan developed in the information analysis and planning stage. Security vulnerabilities include, for example, system misconfigurations that enable an unauthorized user to gain access using a known series of steps.

The vulnerability search may be performed using an automated vulnerability scanner, which is a software package that determines whether certain known flaws may be used to gain unauthorized access to the target. Manual vulnerability scanning also may be performed to probe for common vulnerabilities that, for various reasons, may have been missed by an automated scanner. However, such vulnerability scanning techniques merely list the vulnerabilities, rather than actually attempt to exploit them.

The automated and manual vulnerability searches may be supplemented by research performed by the security auditor to determine previously unknown vulnerabilities. Such research typically is performed using a copy (also called a mirror) of the software application being probed and/or the associated hardware.

4. Compromising and accessing the target system: The auditor attempts to compromise the target system based on the results of the vulnerability detection stage using publicly available or custom-developed programs.

Publicly available programs designed to exploit system vulnerabilities tend to be unreliable and require testing and customization before use. In general, exploiting detected vulnerabilities, regardless of the tools being used, requires experienced and knowledgeable personnel having a highly specialized skill base. In addition, a considerable laboratory infrastructure may be required to develop and test vulnerability exploitation tools, particularly when the target system employs a number of different operating system platforms.

5. Analysis and reporting: This stage includes consolidating and presenting the information obtained during the previous stages and developing recommendations for remedying the security vulnerabilities identified during the penetration test. Manually maintaining a record of all of the actions taken and information gathered during testing is extremely time consuming and prone to error. Moreover, the preparation of complete and accurate records is subject to the discipline of the personnel conducting the test.
6. Clean up: The compromising and accessing stage typically results in significant changes being made to the target system. In the clean up stage, the auditor returns the system to its original configuration. To perform a successful clean up, a detailed and exact list of all actions performed during testing must be maintained, yet there are only rudimentary tools available for maintaining such information.

In view of the shortcomings discussed above, there is a need for a system and method for performing an automated penetration test employing computer system compromise that takes an entirely fresh approach and overcomes the drawbacks of the conventional techniques.

SUMMARY OF THE INVENTION

The present invention generally provides a novel system, method, and computer code for performing automated penetration testing for analyzing computer system security by compromising the security in a systematic manner.

One aspect of the present invention provides a system, method, and computer code for performing penetration testing of a target computer network by installing a remote agent in the target computer network. A local agent is provided in a console and configured to receive and execute commands. A user interface provided in the console and configured to send commands to and receive information from the local agent, process the information, and present the processed information. A database is configured to store the information received from the local agent. A network interface is connected to the local agent and configured to communicate via a network with the remote agent installed in the target computer network. Security vulnerability exploitation modules are provided for execution by the local agent and/or the remote agent.

Embodiments of this aspect may include one or more of the following features. The user interface may enable a user to select one of the modules and initiate execution of the selected module on either the local agent or the remote agent. The user interface may provide a graphical representation of the target computer network.

Another aspect of the present invention provides an agent for use in a system for performing penetration testing of a target computer network. The agent includes a proxy server configured to receive and execute system calls received via a network and a virtual machine configured to execute scripting language instructions received via the network.

Embodiments of this aspect may include one or more of the following features. The agent may include an execution engine configured to control the proxy server and the virtual machine. The system calls and the scripting language instructions may be routed to the proxy server and the virtual machine, respectively, by the execution engine. The agent may include a remote procedure call module configured to receive commands from the network formatted in a remote procedure call protocol and pass the commands to the execution engine.

Another aspect of the present invention provides an agent including a proxy server configured to receive and execute system calls received via a network and a virtual machine configured to execute scripting language instructions received via the network. The agent further includes a secure communication module configured to provide secure communication between the virtual machine and the network. An execution engine is configured to control the proxy server and the virtual machine. The system calls and the scripting language instructions are routed to the proxy server and the virtual machine, respectively, by the execution engine. A remote procedure call module is configured to receive commands via the network formatted in a remote procedure call protocol and pass the commands to the execution engine. A second secure communication module is configured to provide secure communication between the remote procedure call module and the network.

Another aspect of the present invention provides a system, method and computer code for performing penetration testing of a target network in which a first module is executed in a console having a user interface. The first module is configured to exploit a security vulnerability in a first target host of the target network. A first remote agent is installed in the first target host. The first remote agent is configured to communicate with the console and a second remote agent. A second module is executed in the first remote agent. The second module is configured to exploit a security vulnerability in a second target host of the target network.

Embodiments of this aspect may include the feature of installing a second remote agent in the second target host of the target network, the second remote agent being configured to communicate with the first remote agent.

Another aspect of the present invention provides a system, method, and computer code for performing penetration testing of a target network. A first module is executed to exploit a security vulnerability of a first target host of the target network. A first remote agent is installed in the first target host as a result of exploiting the security vulnerability of the first target host. A system call is sent to the first remote agent via a network. The system call is executed in the first target host using a proxycall server of the first remote agent to exploit a security vulnerability of a second target host.

In another aspect, a first module is executed to exploit a security vulnerability of a first target host of the target network. A first remote agent is installed in the first target host as a result of exploiting the security vulnerability of the first target host. A second module that generates a system call is executed in the first remote agent. The system call is executed in the first target host to exploit a security vulnerability of a second target host.

In another aspect, a first module is executed to exploit a security vulnerability of a first target host of the target network. A first remote agent is installed in the first target host as a result of exploiting the security vulnerability of the first target host. A second module is executed in the first remote agent that generates a system call. A second remote agent is installed in the second target host as a result of exploiting a security vulnerability of the second target host. The system call generated by the second module is sent to the second remote agent via a network. The system call is executed in the second target host using a proxycall server of the second remote agent.

In another aspect, a first module is executed to exploit a security vulnerability of a first target host of the target network. A first remote agent is installed in the first target host as a result of exploiting the security vulnerability of the first target host. A second remote agent is installed in the second target host as a result of exploiting a security vulnerability of the second target host. A system call is sent to the first remote agent and is sent from the first remote agent to the second remote agent. The system call is executed in the second target host using a proxycall server of the second remote agent.

In another aspect, a first remote agent is installed in the first target host. The first remote agent has a proxy server configured to receive and execute system calls. A system call received via a network is executed in the first remote agent. A second remote agent is installed in the first target host. The second remote agent has a proxy server configured to receive and execute system calls and a virtual machine configured to execute scripting language instructions. A scripting language instruction or a system call received via the network is executed in the second remote agent.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

Figure 1:
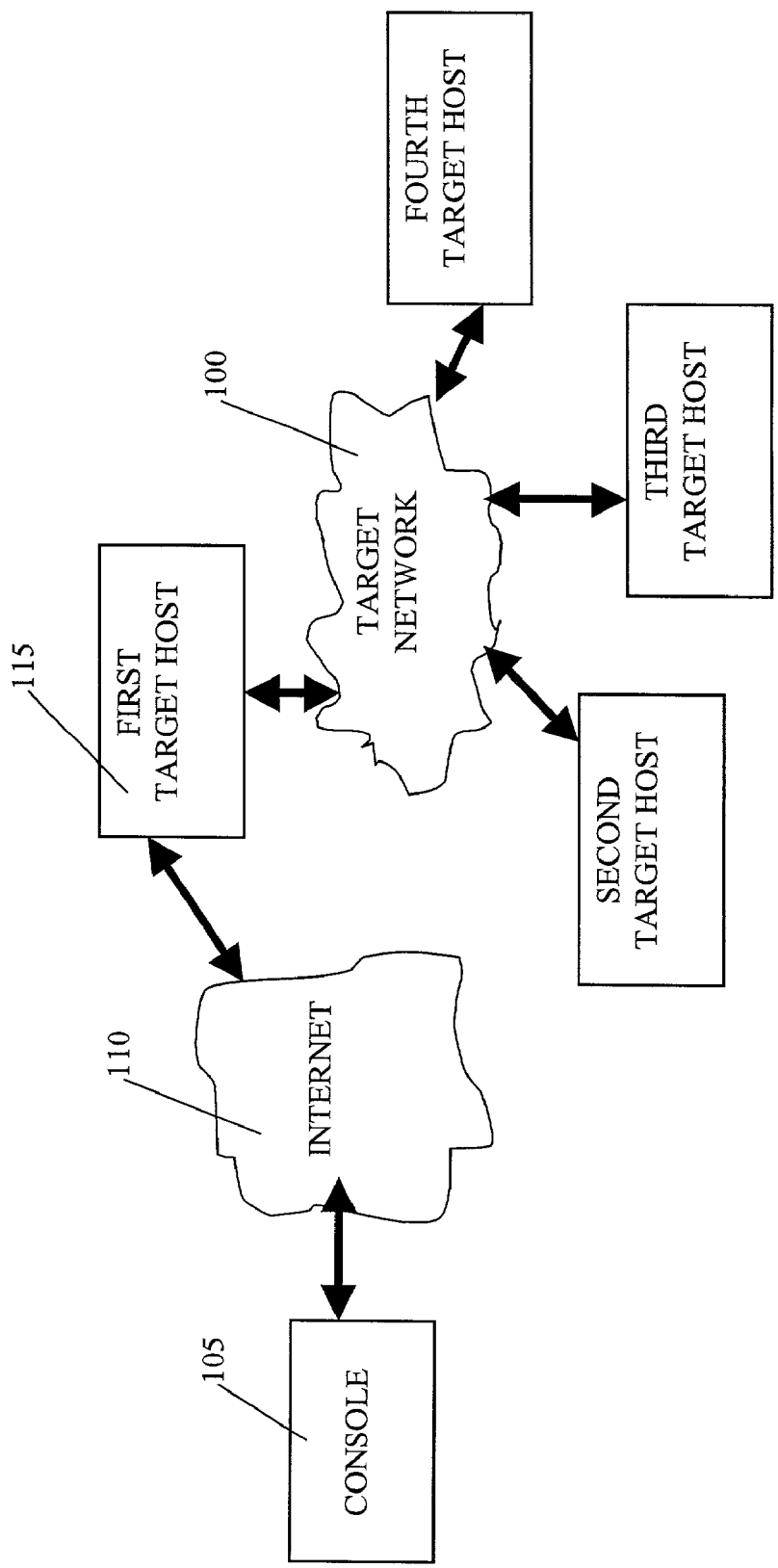
FIG. 1 is a block diagram of a system for performing automated penetration testing of a target network in accordance with the present invention.

According to the present invention, as shown in FIG. 1, an automated penetration test is performed to identify, analyze, exploit, and document security vulnerabilities in a target network 100. The penetration test is executed by a console 105 that may be, for example, a personal computer running Microsoft Windows 2000 Professional, Server, or Advanced Server operating systems. The target network 100 may be connected to a network, such as for example the Internet 110. In the case of such example, the console also would be connected to the Internet 110 and would gain access to the target network 100 through the Internet 110.

The target network 100 has a first target host 115, e.g., a firewall. The firewall is a security device that typically is the only host in the target network that is connected directly to the Internet. It handles Internet traffic to and from the target network and serves to protect the target network from unauthorized access. The target network 100 has a number of other hosts connected to it-all of which could be the eventual targets of the penetration test.

Figure 2:
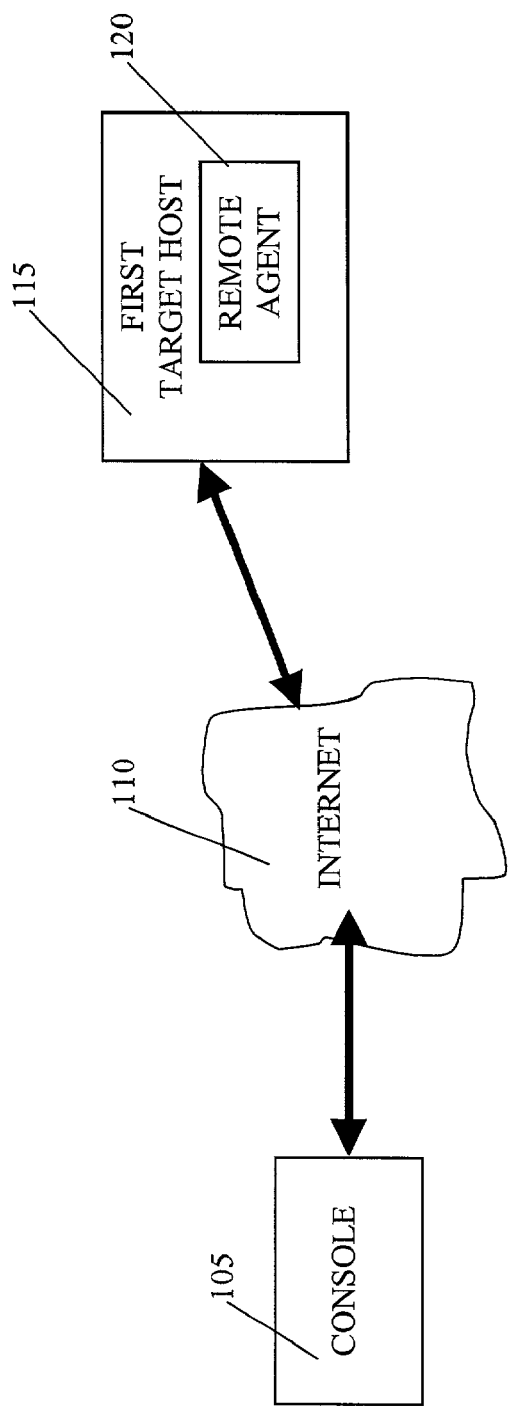
FIG. 2 is a block diagram of a console for automated penetration testing connected through the Internet to a first target host.

The console 105, shown in FIG. 2, compromises the security measures protecting the first target host 115 by executing a series of modules. The modules may be selected and initiated by the user. Alternatively, the console may execute a predetermined sequence of modules or may determine a sequence of modules to be executed based on the information gathered during the penetration testing.

In the initial stage, typically, modules are executed to gather information about the first target host 115. For example, the console 105 may execute a port scanner that analyzes the ports of the first target host 115 and determines all of the services that are being run, such as an Internet web server, an email server, a finger service, etc. Further information might be acquired by running modules designed to exploit the services identified by the port scanner. For example, if the first target host 115 is running a finger service, then that service will be targeted by a module to determine software version, user names, etc. As a further example of an information gathering module, a network discovery module may be used to determine the number of hosts in the target network 100 and the Internet Protocol (IP) address of each host.

Following execution of the information gathering modules, the console executes modules, called exploits, to exploit security vulnerabilities in the first target host 115 based on the information that has been retrieved. For example, information may be obtained regarding a firewall operating system being run on the first target host 115, such as the software brand and revision number. Based on this information, the console 105 executes an exploit that has been written to take advantage of security vulnerabilities for that particular firewall.

Once a service running on the first target host 115 has been compromised, the console 105 installs a remote agent 120 on the first target host. The remote agent 120 is a program that operates on the first target host 115 to perform a number of functions, such as receiving and executing control commands and modules from the console 105 and sending back information to the console 105.

Figure 3:
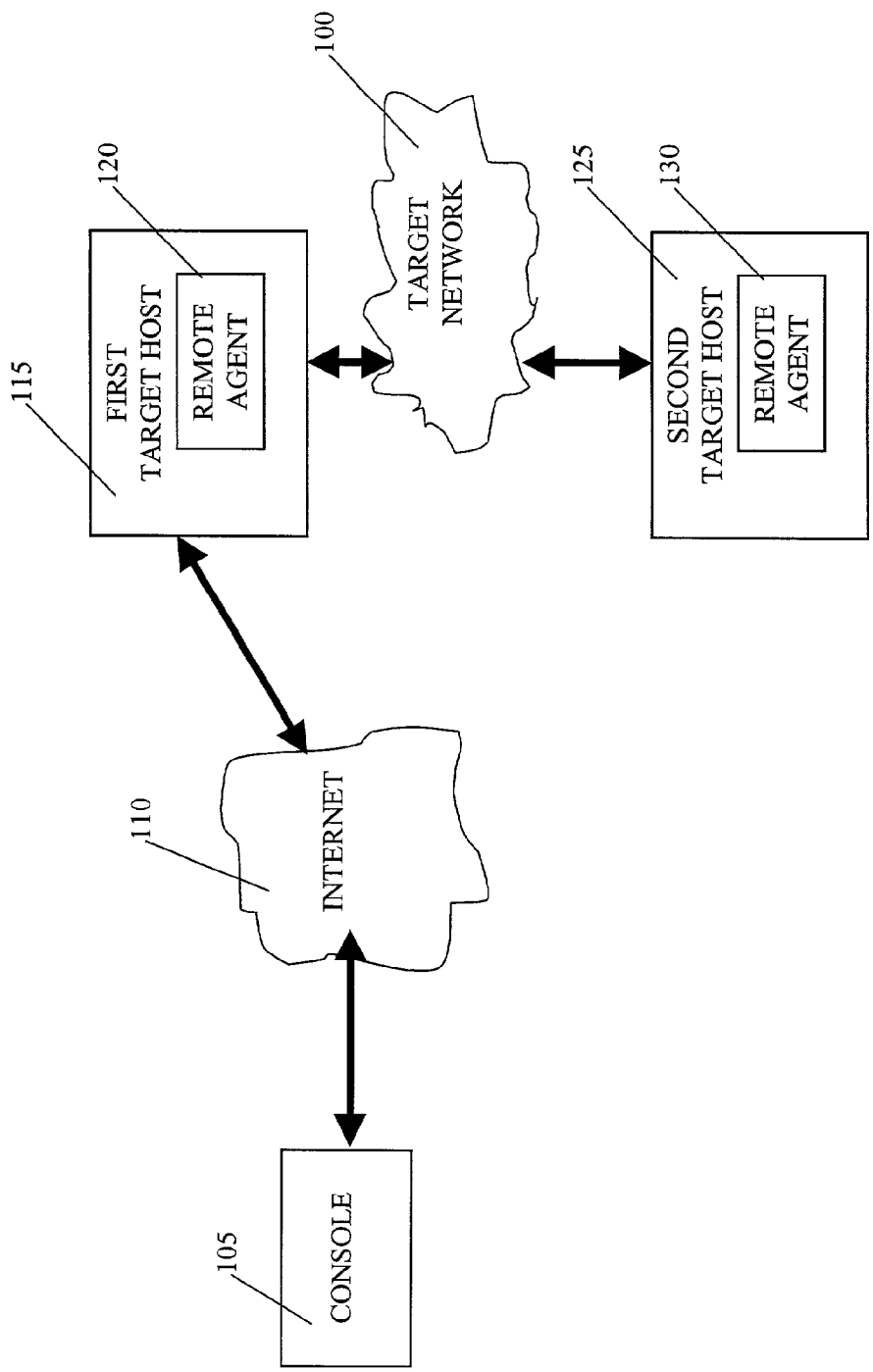
FIG. 3 is a block diagram of the console connected through the Internet to a first target host, which is connected through a target network to a second target host.

As shown in FIG. 3, once the remote agent 120 has been installed on the first target host 115, it is used by the console 105 to gain access to the target network 100 and compromise the security of the other hosts that make up the target network 100, such as the second target host 125. For example, the remote agent 120 on the first target host 115 executes exploits, such as those discussed above, or system calls received from the console 105 to gather information and exploit other security vulnerabilities in the target network 100. To hosts connected to the target network 100, such commands or queries appear to originate from the first target host 115 and therefore may be more readily accepted. This is particularly true for networks that employ hierarchies of trust, which means that commands from known, i.e., trusted, sources are subject to less stringent security measures than commands from unknown sources.

Once the security of the second target host 125 has been compromised, the remote agent 120 in the first target host 115 installs a remote agent 130 in the second target host 125. Each of the installed agents 120 and 130 sends and receives modules, commands, and data from other installed agents, which is referred to as chaining. For example, the agent 130 in the second target host 125 receives modules and commands from the agent 120 in the first target host 115, which, in turn, receives the modules and commands from the console. The agent 130 in the second target host 125 also sends data back to the agent 120 in the first target host 115, which, in turn, sends the data back to the console 105.

The agent 130 in the second target host 125 executes the modules received from the upstream agents to gather information from and exploit security vulnerabilities in a third target host, in a manner similar to that discussed above. Once the security measures have been compromised, the agent in the second target host installs an agent in the third target host. The penetration of the target network may continue in this manner until all of the target hosts have been compromised or until the final target of the penetration testing has been compromised.

The term "exploiting security vulnerabilities", as used herein, is a broad concept that includes any means for gaining access to and/or obtaining information from a target host. The concept includes, without limitation, the execution of modules that are designed to take advantage of specific security vulnerabilities that have been identified in a target host. For example, the first target host 115 may have been misconfigured by the owner in a manner that is detectable and allows installation of a remote agent 120. This concept also includes, without limitation, the execution of information gathering modules, such as port scanners and network discovery modules. This concept further includes, without limitation, the exploitation of security vulnerabilities of a target host that result from the compromise of other target hosts. For example, once a remote agent 120 has been installed in the first target host 115, it maybe possible to gather information and install remote agents on other target hosts due to hierarchies of trust within the target network. This concept further includes, without limitation, obtaining access to a target host by virtue of a lack of security features or measures.

Figure 4:
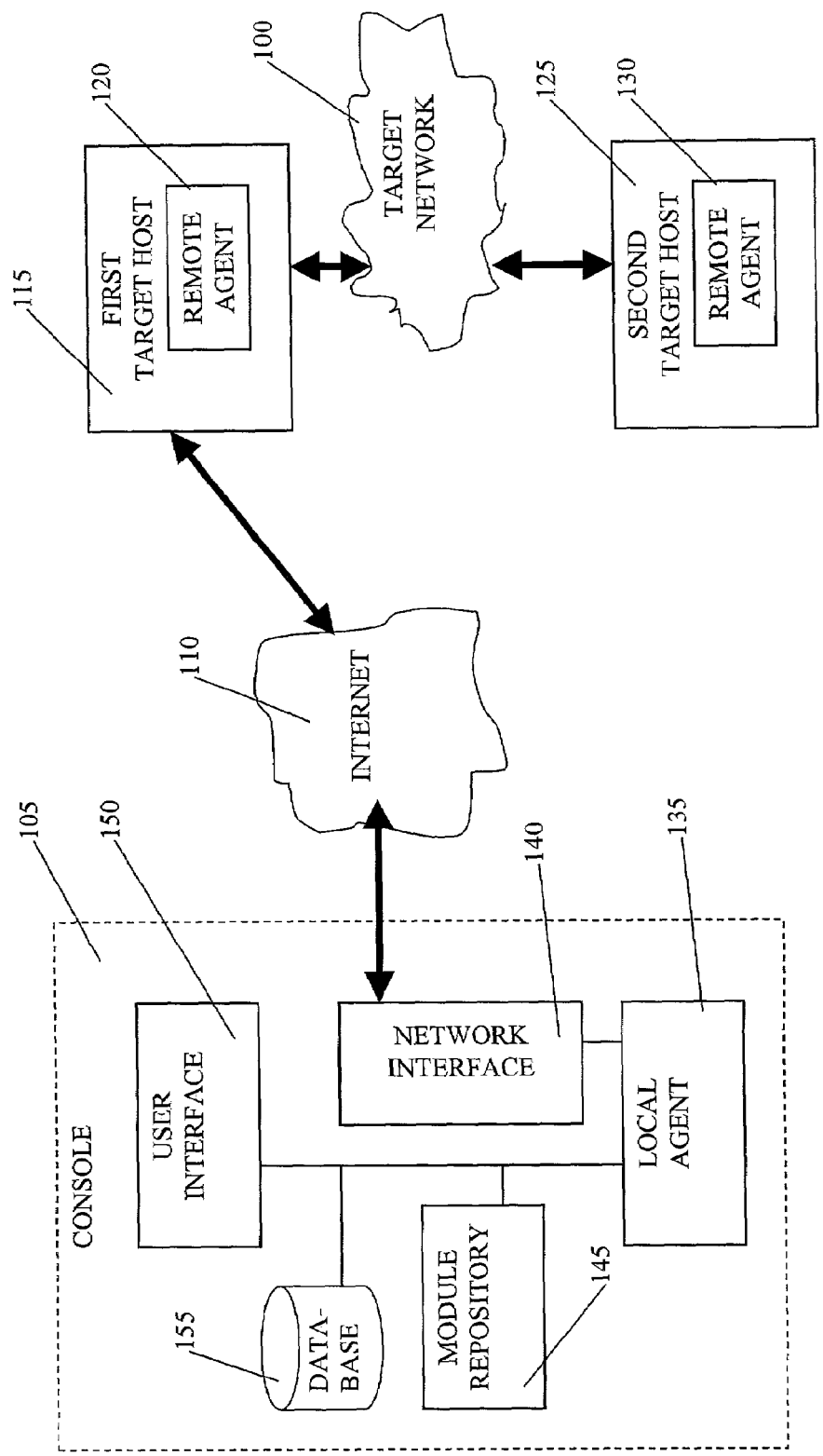
FIG. 4 is a block diagram showing components of the console.

As shown in FIG. 4, a local agent 135 installed in the console 105 communicates with and controls the remote agents 120 and 130 through a network interface 140, such as a network interface card. The console 105 provides a module repository 145 to store modules that perform various functions related to system penetration and compromise. During the penetration test, these modules are sent to the local agent 135 in the console 105 or a remote agent 120 or 130 in a target host 115 or 125 to be executed. For example, a module that performs packet sniffing may be sent to and executed on the remote agent 120 in order to monitor data packets passing through the first target host 115.

The console 105 also provides a user interface 150 that enables the user to control and monitor the performance of the penetration test. The user interface 150 may be a graphical user interface that displays a representation of the target network 100. The user interface 150 also reports the results of the activities performed by the agents installed in the target network.

A database 155 in the console 105 stores information sent back by remote agents 120 and 130. The database 155 could be a standard flat file, for example a text file, although a more complex structure, such as a relational database, also may be used. In addition, data may be exported to an external relational database. Each structured element of information is represented as an object in the database 155. The database 155 can accommodate multiple distributed instances of the same object that can be independently updated. The database 155 synchronizes the multiple instances of the objects to allow revision of the instances with the most recent data.

The information that is stored as objects in the console database 155 includes an activity log of all actions performed by the remote agents 120 and 130, such as executing modules, port scanning the host, passing modules to downstream remote agents, and installing remote agents in other hosts. The information also includes configuration data relating to the deployment of the remote agents, such as identification of the hosts in which the remote agents are installed and the possible communication channels that might be used to connect to them. The information also includes all of the data generated by execution of commands and modules by the remote agents, such as known hosts in the target network, operating systems, open ports, user accounts, cracked passwords, etc. The remote agents may store a subset of the database to provide caching of module data and to make such data available to downstream modules. The cached data is eventually sent back to the console database.

Another type of object that can be managed by the database 155 is referred to as an entity, which is an object that represents a physical component in the target network 100, such as a host. Entities contain information similar to that discussed above, but also may have the capability to perform certain functions. For example, an entity may be capable of serializing and deserializing itself to and from XML markup language for transfer in and out of the database. This allows information produced by modules executed by remote agents to be shared between agents and with the console.

The data stored in the console database 155 is used for a number of purposes, such as to analyze the security vulnerabilities of the target network 100 and plan the exploitation of these vulnerabilities to penetrate further into the target network 100. The data also allows the console to reverse any changes made to the target network 100 during the penetration testing. In addition, the data allows the client for whom the penetration testing is performed to have a complete picture of actions performed during the testing. For example, the data may be exported into a relational database, as mentioned above, or may be used to generate reports using XML.

In general terms, an agent, such as the local and remote agents discussed above, is a program that is controlled by or used as a proxy by another program. The controlling program may be resident on the same host as the agent, as in the case of the user interface that controls the local agent on the console. Alternatively, the controlling program may be on a separate host, as in the case of the local agent on the console that controls the remote agent on the first target host. Hence, in this example, the local agent in the console serves both as an agent and as a controlling program.

Figure 5:
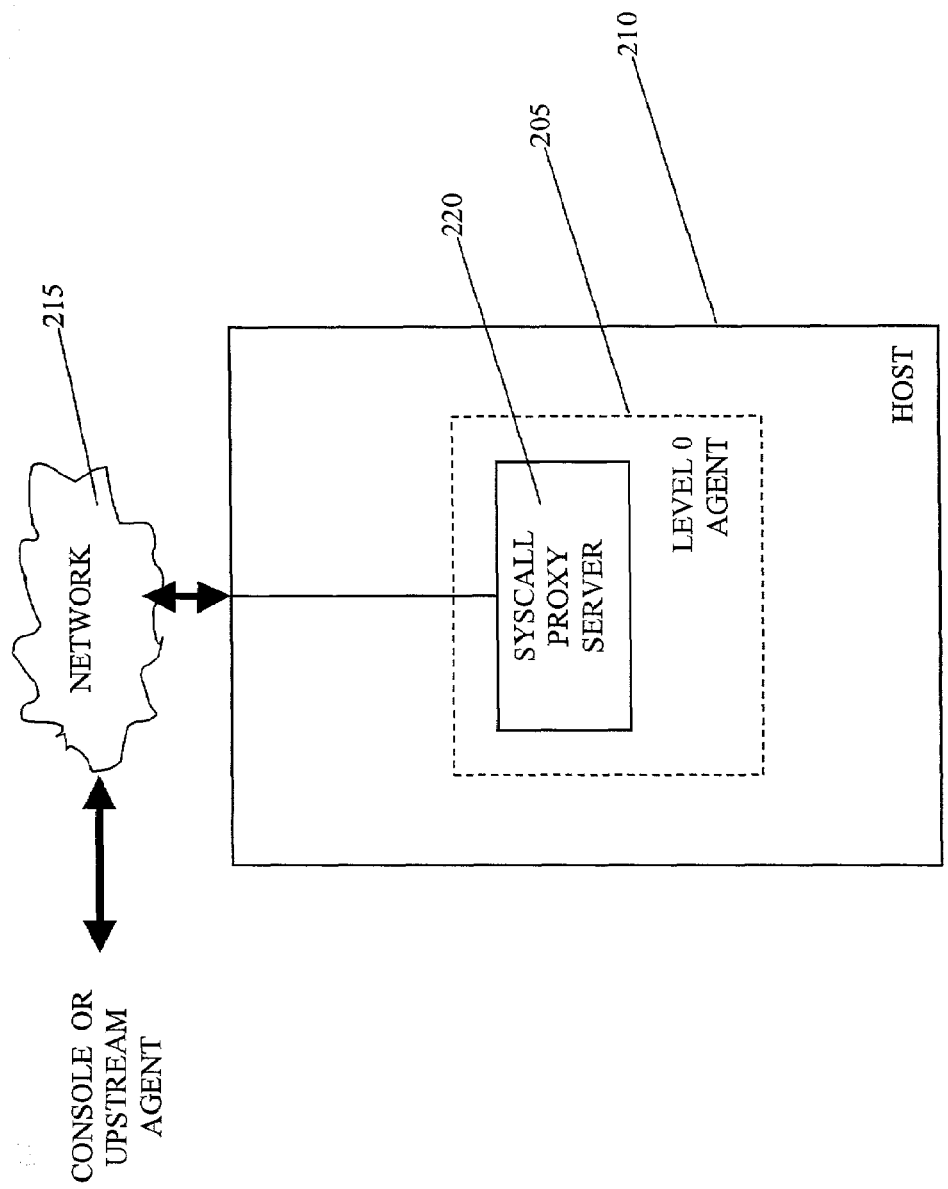
FIG. 5 is a block diagram of a level 0 agent.

FIG. 5 shows an example of a basic agent, which is referred to as a level 0 agent 205, running on a host 210 that is connected to a network 215. The level 0 agent 205 communicates through the network 215 to a controlling program running on an upstream agent, such as the local agent 135 in the console 105 or an intermediate agent positioned between the console and the level 0 agent. The level 0 agent 205 provides a syscall proxy server 220 that enables it to act as a proxy for the controlling program. This configuration is referred to as a system call proxy or proxycall configuration.

For example, referring again to FIG. 4, a level 0 agent 205 may be installed as the remote agent 120 on the first target host 115 and may be controlled by a module executed by the local agent 135 in the console 105 such as, for example, a remote exploit. The module includes commands that result in system calls ("syscalls"), which are instructions that access the operating system of the host. Rather than executing the syscall on the console 105, the syscalls are sent by a proxy client in the local agent 135 to the syscall proxy server 220 in the remote agent 120. The syscall proxy server 220 executes the syscalls on the first target host 115. Thus, syscalls are executed on the host of the remote agent 120, e.g., the first target host 115, rather than the host of the local agent 135, e.g., the console 105.

By acting as a syscall proxy, the remote agent 120 allows the local agent 135 to execute commands as if the local agent 135 were resident on the first target host 115. The syscall proxy configuration allows large, complex programs, such as the automated penetration testing program resident on the console 105, to execute system calls on a target host without actually being resident on the target host. Only the relatively small agent needs to be installed on the target host.

The level 0 agent 205 is a relatively simple program and may be about 100 bytes in size or smaller. Due to its small size, the level 0 agent 205 is typically the first type of agent to be installed in the target host during penetration testing. It may be used to gather information and/or exploit vulnerabilities in the target host to enable further penetration of the target host. Thus, the level 0 agent helps open the way for the installation of more complex agents, as discussed below.

The level 0 agent is often installed directly as the result of exploiting a security vulnerability, e.g., during exploitation of a buffer overflow or user-supplied format string vulnerability in an application running on the target host. The installed agent runs in the process space of the compromised application, e.g., an Internet web server or email server, and opens a socket to provide an unencrypted communication channel to the console or upstream agent. The syscall proxy server 220 in the level 0 agent 205 can execute one syscall at a time.

Figure 6:
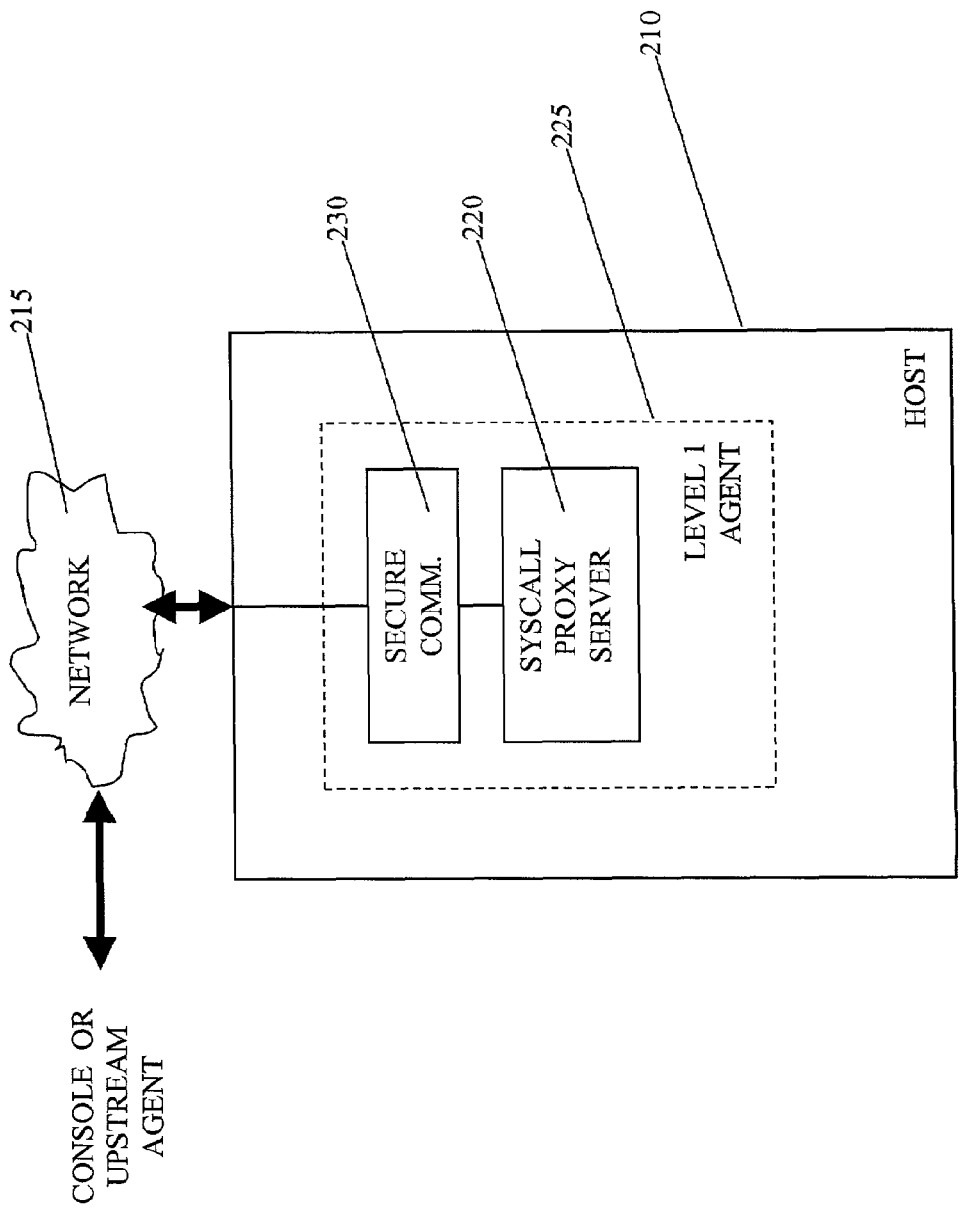
FIG. 6 is a block diagram of a level 1 agent.

FIG. 6 shows an example of a more complex agent, which is referred to as a level 1 agent 225. The level 1 agent 225, like the level 0 agent 205, provides a syscall proxy server 220 to execute commands received from the console 105 or an upstream agent. The level 1 agent 225 can spawn separate syscall proxy servers 220 for corresponding syscalls received from the upstream agent, so several syscalls can be executed simultaneously. The level 1 agent 225 also can allocate memory and other resources within the host. Hence, the level 1 agent 225 can run in its own process space rather than relying solely on the process space of a compromised application. The ability to run in its own process space gives the level 1 agent 225 more autonomy and control over its own lifetime and more control over the resources of the host 210.

The level 1 agent 225 also provides a secure communication channel 230 with authentication and encryption of data. Data transmitted by the level 1 agent 225 back to the console 105 or upstream agent is encrypted to ensure that information about the compromised system cannot be detected by third parties that may be monitoring network communications. The data is authenticated, e.g., using a digital signature, so that only the console that created the agent can communicate with it. This prevents different users who may be running the security compromise system from communicating with each other's agents.

Figure 7:
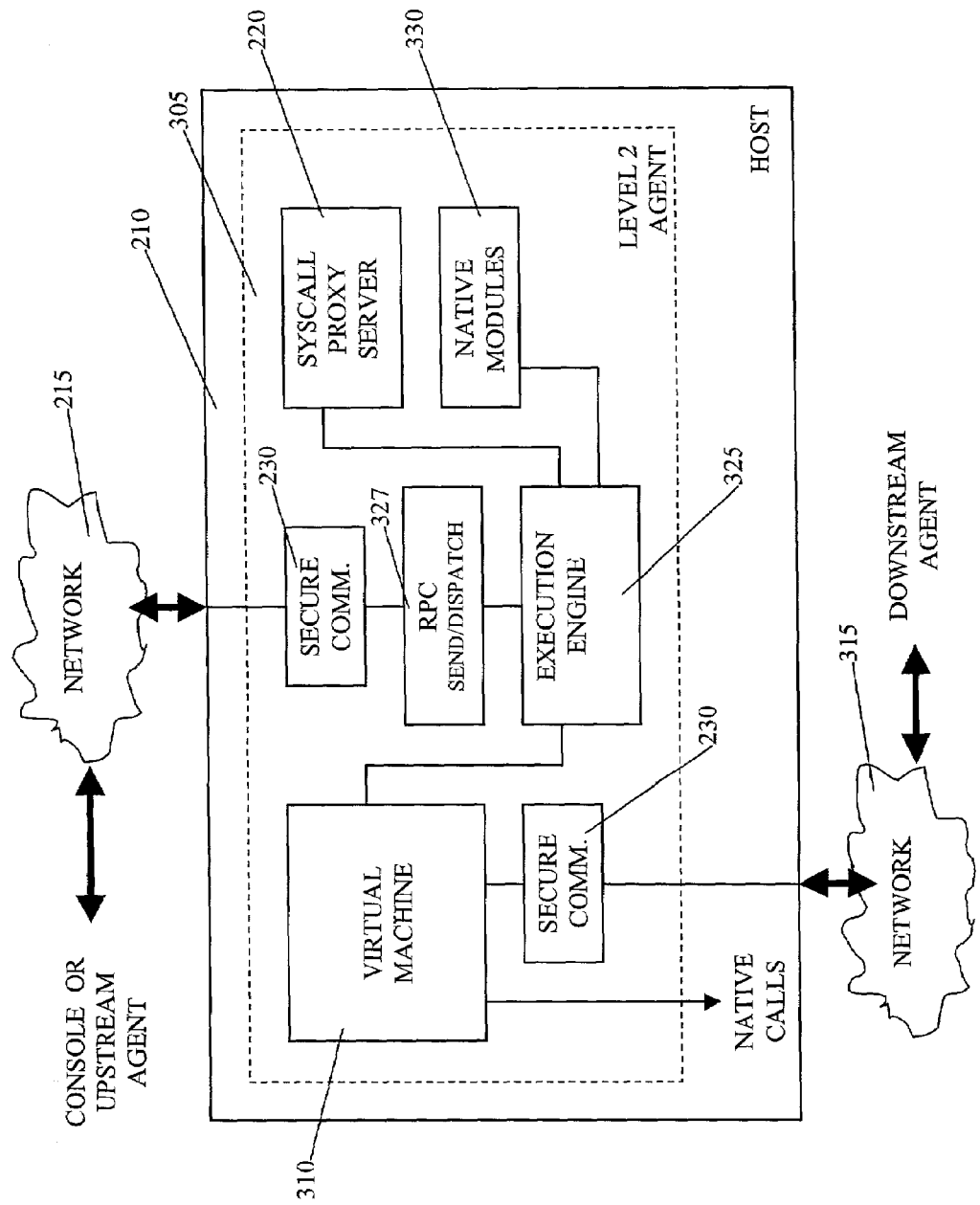
FIG. 7 is a block diagram of a level 2 agent connected to upstream and downstream agents by two different networks.

FIG. 7 shows an example of a more complex agent, which is referred to as a level 2 agent 305. The level 2 agent 305, like the level 1 agent 225, provides a syscall proxy server 220 and secure communication 230 capability. The syscall proxy server 220 allows the level 2 agent to execute syscalls received from a module running on an upstream agent in a manner similar to the level 0 and level 1 agents. For example, a module running on the local agent 135 in the console 105 such as, for example, a remote exploit, may generate system calls that are intended to be executed in the operating system of the target host, rather than the console. Such syscalls are sent to the syscall proxy server 220 of the remote agent in the target host to be executed.

The level 2 agent 305 also provides a virtual machine 310 that can execute modules written in high-level, platform-independent, scripting languages, such as Python, Perl, Java, and Tcl. A module, in general, is an element of program code containing an individual operation or group of operations that are to be executed. Most of the modules used in the automated penetration test are designed to exploit security vulnerabilities in or gather information from a target host. Such modules may be obtained in a variety of ways. For example, laboratory testing may be performed on widely used software products to determine possible security vulnerabilities and how to exploit them. A module is then written for each software product based on the results of this testing. As a further example, such modules are commonly written and made available on the Internet by members of the on-line security research community or by hackers or crackers, i.e., persons who attempt to gain unauthorized access to computer systems.

One advantage of executing modules in a virtual machine 310 is that it allows the level 2 agent 305 to perform computationally-intensive operations on the target host 210 without receiving a continuous flow of instructions, as in the case of syscall proxying. Indeed, syscall proxying may not be feasible for computationally-intensive operations because of the delays in transmitting instructions that result from network latency. Thus, the virtual machine 310 of the level 2 agent 305 can take greater advantage of the processor and other resources of the target host 210.

Another advantage of executing modules in a virtual machine 310 is that the modules need not be included as an integral part of the agent, but instead may be transferred to the agent on demand.

This obviates the need to port the modules to the target host 210 operating system. Thus, modules can be run in a variety of target hosts without being rewritten for each different target host operating system. Moreover, the size of the agent is substantially reduced. In addition, because there are many widely available programs and modules written in standard scripting languages, the amount of custom programming required to create modules to execute on the target host is reduced.

The virtual machine 310 can communicate with, control, and install modules in downstream agents by opening a network connection to the target host 210 to access a network 315. The communication with the downstream agents may be established by a secure communication module 230 that forms a secure communication channel with data encryption and authentication. The virtual machine 310 can also handle native calls, which are syscalls that are intended to be executed in the operating system of the target host 210 on which the virtual machine 310 is installed. For example, an information gathering module may execute a syscall in the operating system of the target host 210 on which the virtual machine 310 is installed in order to access the Internet through a network interface.

Figure 8:
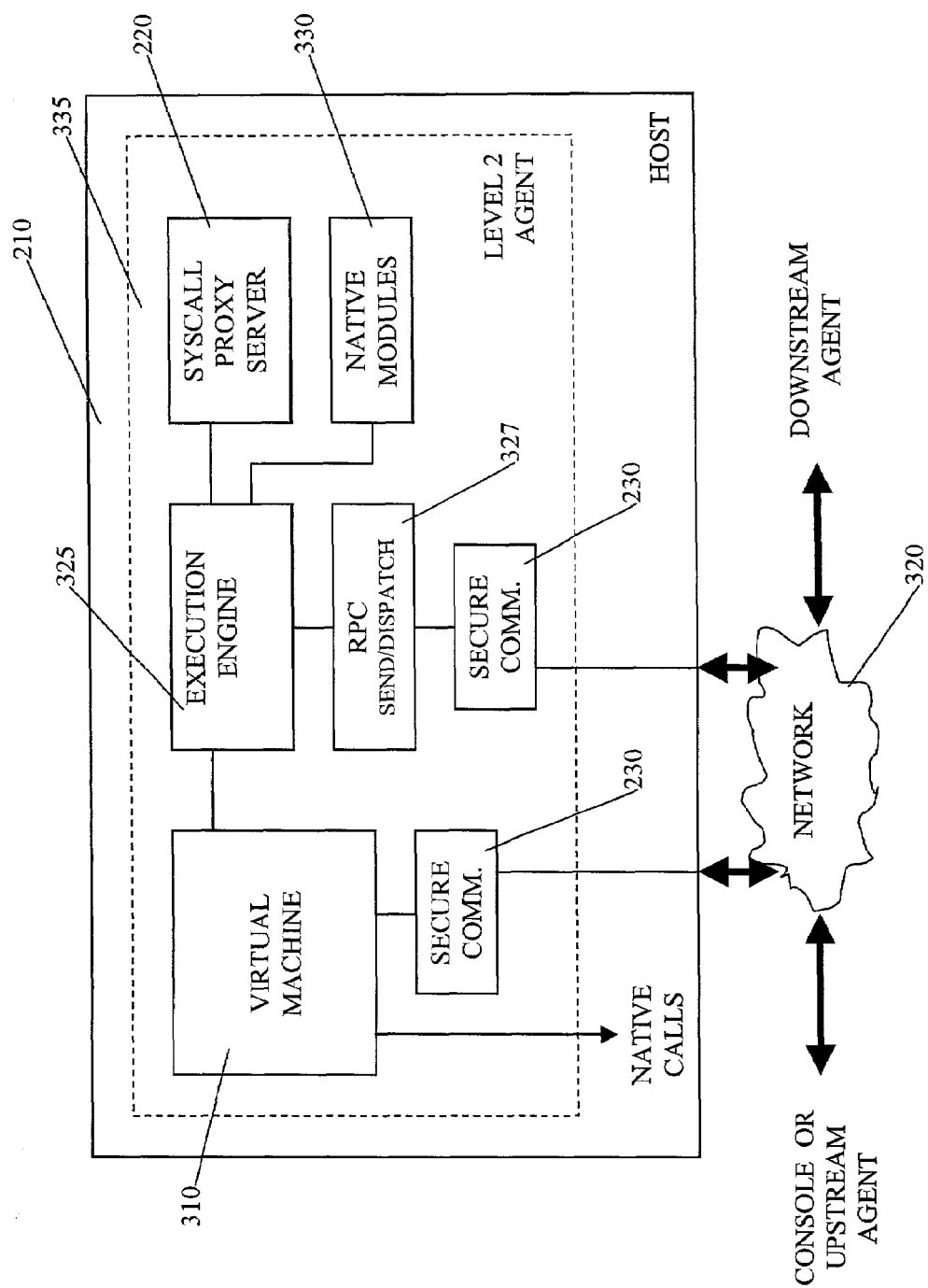
FIG. 8 is a block diagram of a level 2 agent connected to upstream and downstream agents by a single network.

In the example shown in FIG. 7, the network 315 accessed by the virtual machine 310 is separate from the network 215 used to communicate with the console 105 or upstream agent. The network 315 accessed by the virtual machine 310 may be a target network 100, such as shown in FIGS. 1 and 3, that cannot be reached from an outside host. Alternatively, as shown in FIG. 8, the network 320 accessed by the virtual machine 310 may be the same network 320 used to communicate with the console 105 or upstream agent. For example, as shown in FIG. 1, both the second and third target hosts are connected to the target network, and a virtual machine in an agent on the second target host may communicate with an agent installed on the third target host.

The virtual machine 310 and the syscall proxy server 220 in the level 2 agent 305 are controlled by an execution engine 325 that determines which modules are executed and how they are executed. For example, the execution engine 325 provides task control capability to start, pause, resume, and cancel module execution. The execution engine 325 also controls the execution of native modules 330, which are modules written to be executed directly in the operating system of the target host 210.

The execution engine 325 provides transparent multitasking capabilities by taking advantage of either the multi-threading or multi-processing capabilities of the underlying operating system to enable concurrent execution of modules and syscalls by spawning new threads or processes as necessary. Task-specific storage is provided to enable an executing module to access context information. For example, upon initialization, the execution engine may set up synchronization objects (known as mutexes) and task-specific storage for module context using, e.g., the ThreadLocalStorage routine in Win32 or the thread-specific routine in PTHREADS.

The execution engine 325 is isolated in certain respects from the rest of the system architecture, aside from the modules that are controlled by it. For example, the execution engine 325 operates independently of the proxycall architecture. In addition, necessary parameters for the modules to execute on the agent are provided by the module context, rather than by the execution engine 325.

The module context provides all of the information necessary for a specific execution instance (the execution instance being, e.g., a task or executing module). Such information includes the module parameters, designation of remote or local execution, description of the peer (for remote execution), etc. The module context is available from any subsystem of the agent that is involved in the module execution, e.g., a proxycall client. The module accesses the module context from the agent during execution of the module.

The level 2 agent receives commands and instructions through a remote procedure call (RPC) component 327, which then passes the received data to the execution engine 325. The RPC component 327 employs a standard protocol to control communication with the console or upstream agent using a predefined data packet format. To implement this protocol, the console uses an internal representation of all the deployed agents that includes all of the properties and capabilities for establishing a communication channels with the deployed agents.

Communications between the console and deployed level 1 and level 2 agents are established as follows. First, the console establishes an internal connection with the internal representation of the remote agent with which it is attempting to communicate. The internal representation of the remote agent uses its communications component to establish a communication channel across the network with the remote level 1 or level 2 agent. The communication channel then is created using a component of the system that can multiplex communications from several modules into one or many communications channels with a remote agent.

The RPC component 327 implements a bidirectional communication mechanism using the communications channel described above as an underlying transport mechanism. The RPC component implements and executes commands that control the execution of modules on the remote agents as well as the transfer of information between agents. For example, the RPC component is used to start, pause and stop module execution. The RPC component also is used to transfer modules to remote agents, retrieve module execution results from remote agents, and control the configuration and status of remote agents.

Figure 9:
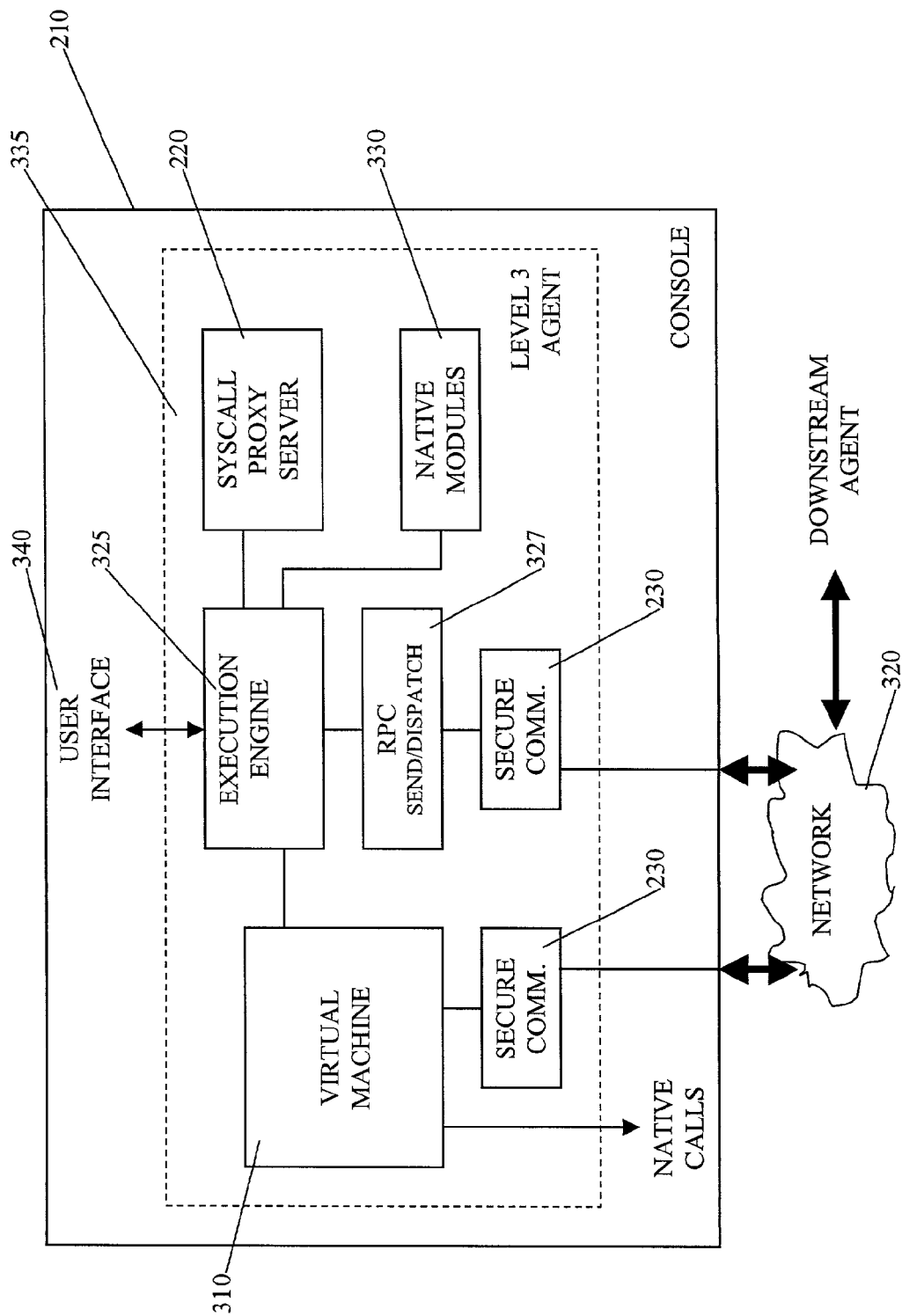
FIG. 9 is a block diagram of a level 3 agent.

FIG. 9 shows an example of a level 3 agent 335, which is similar to the level 2 agent 305 shown in FIG. 8, but includes a user interface 340 through which the level 3 agent 335 is controlled. The user interface 340 allows the level 3 agent 335 to function as the local agent 135 component of the console 105, as shown in FIG. 2. The level 3 agent 335, like the level 2 agent 305, includes secure communication capability 230, a virtual machine 310, a syscall proxy server 220, native module capability 330, an RPC send/dispatch component 327, and an execution engine 325.

Figure 10:
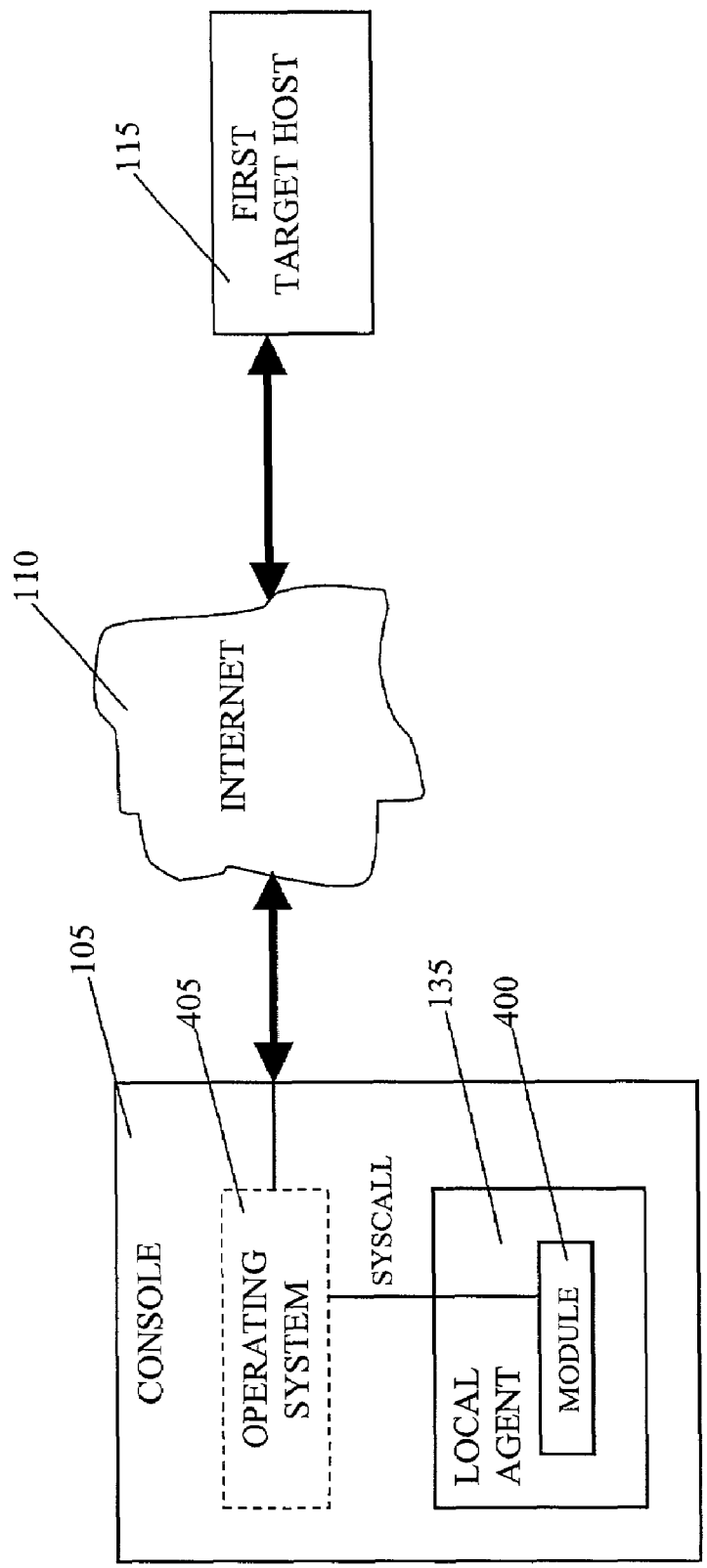
FIG. 10 is a block diagram of a configuration in which a module is executed by the local agent in the console and system calls are executed in the operating system of the console.

The proxycall and virtual machine capabilities discussed above enable the agents to execute modules in a number of different configurations. FIG. 10 shows a configuration in which a module 400 is executed by the local agent 135 in the console 105. System calls generated by the module 400 are handled by the local agent 135 as native syscalls and are executed in the operating system 405 of the console 105. For example, when a module 400 executes a command for querying the status of a port on a target host 115, a system call is made to the operating system 405 of the console 105 in order to access the network interface 140 and transmit the request to the target host 115 through the Internet 110.

Figure 11:
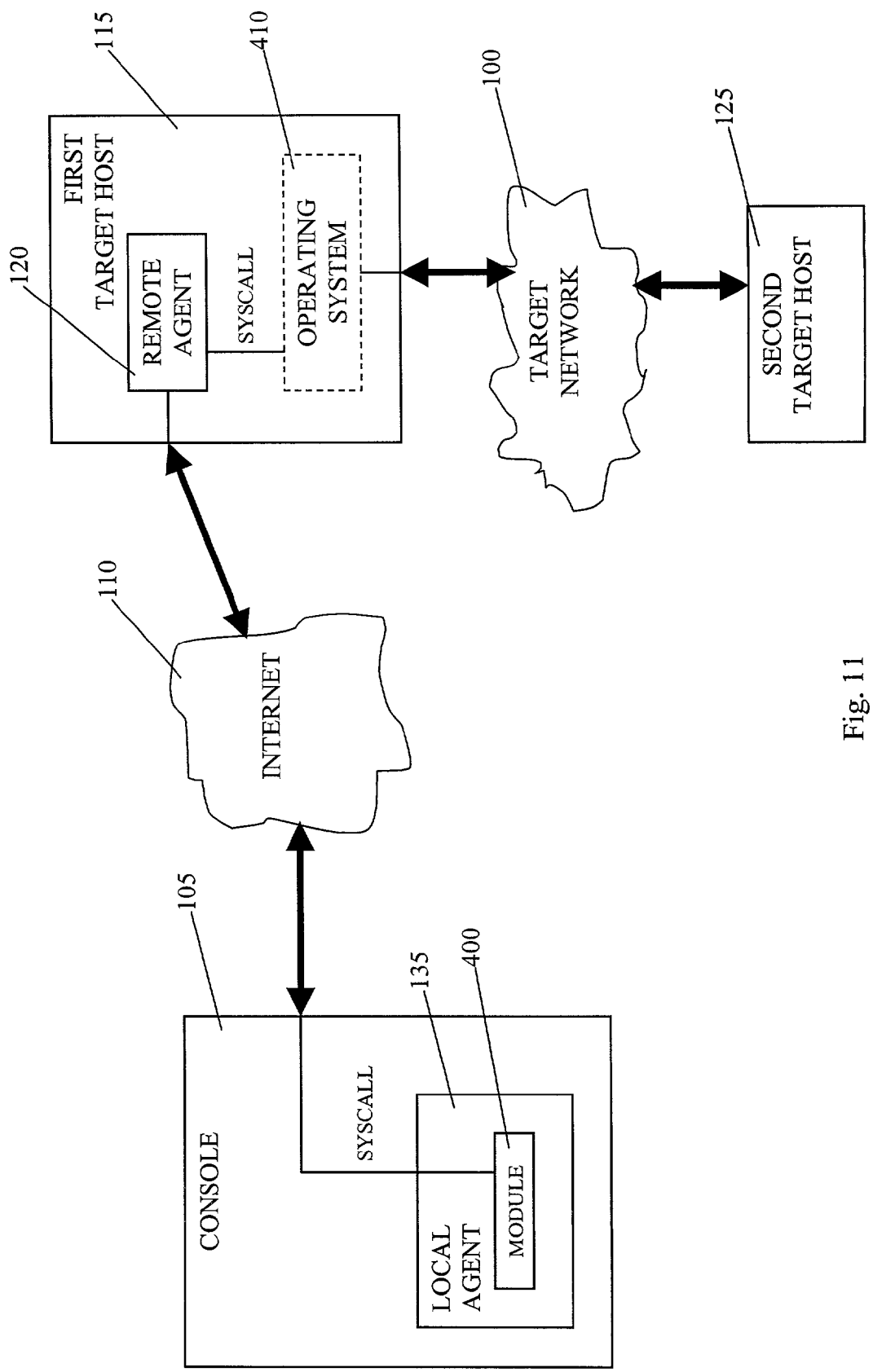
FIG. 11 is a block diagram of a configuration in which a module is executed by the local agent in the console and system calls are executed in the operating system of the first target host.

Another configuration in which a module is executed by the local agent 135 in the console 105 is shown in FIG. 11. In this configuration, however, system calls generated by the module 400 are transmitted to a remote agent 120 installed in the first target host 115. The system calls are handled by the syscall proxy server of the remote agent 120 and are executed in the operating system 410 of the first target host 115. For example, when a module 400 executes a command for retrieving a file from the second target host 125 through the target network 100, the syscall generated by this command is executed in the operating system 410 of the first target host 115. From the perspective of the second target host 125, the command appears to have been executed on the first target host 115 and therefore is more likely to be trusted and implemented by the second target host 125.

Figure 12:
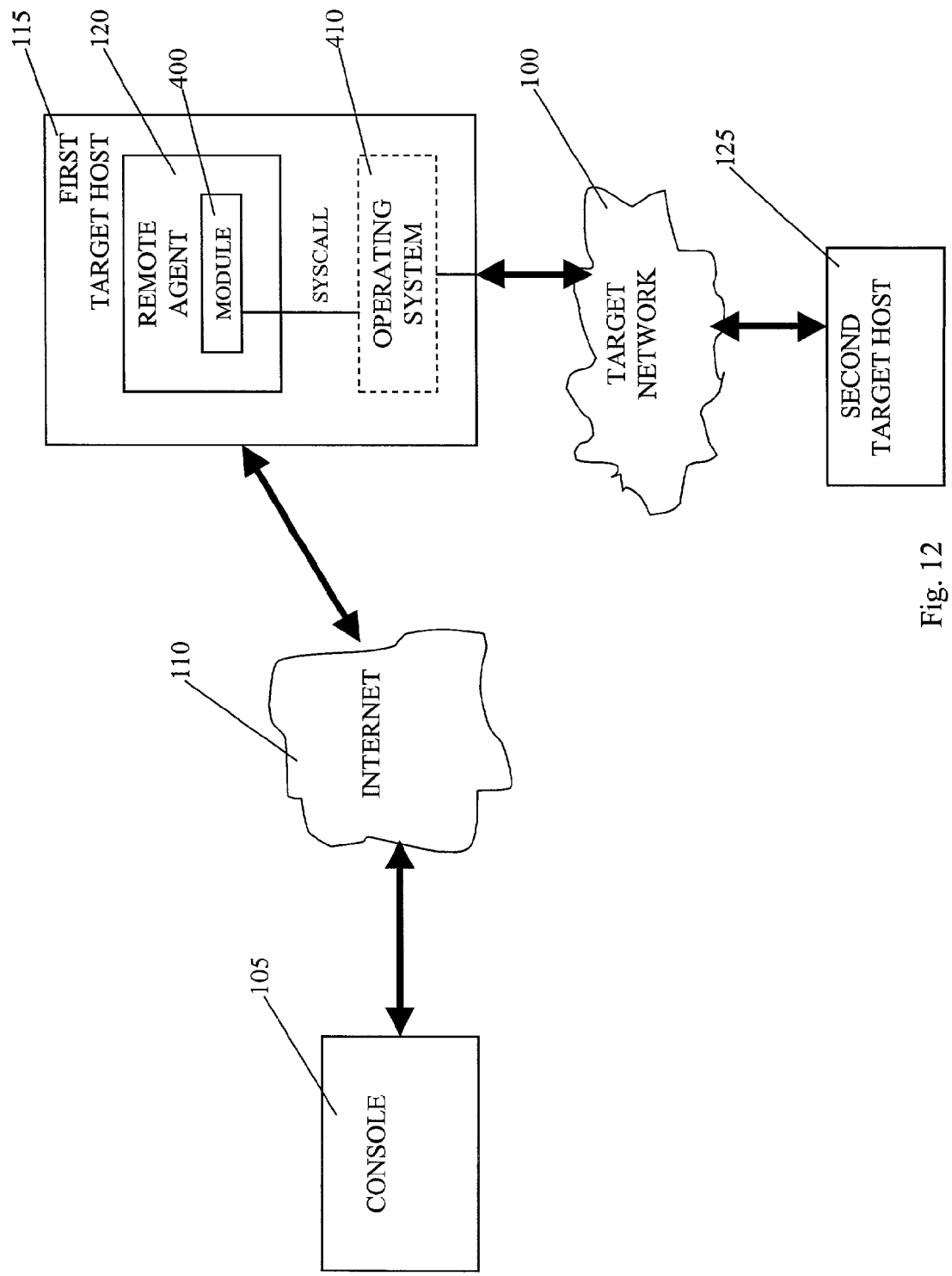
FIG. 12 is a block diagram of a configuration in which a module is executed by the remote agent in the first target host and system calls are executed in the operating system of the first target host.

FIG. 12 shows a configuration in which a module 400 is executed by a remote agent 120 in a target host, e.g., the first target host 115. System calls generated by the module 400 are handled by the remote agent 120 as native syscalls and are executed in the operating system of the first target host 410. This configuration allows the module 400 to take advantage of the resources of the first target host 115. In addition, it enables the module 400 to run without generating network traffic between the console 105 and the target network 100.

Figure 13:
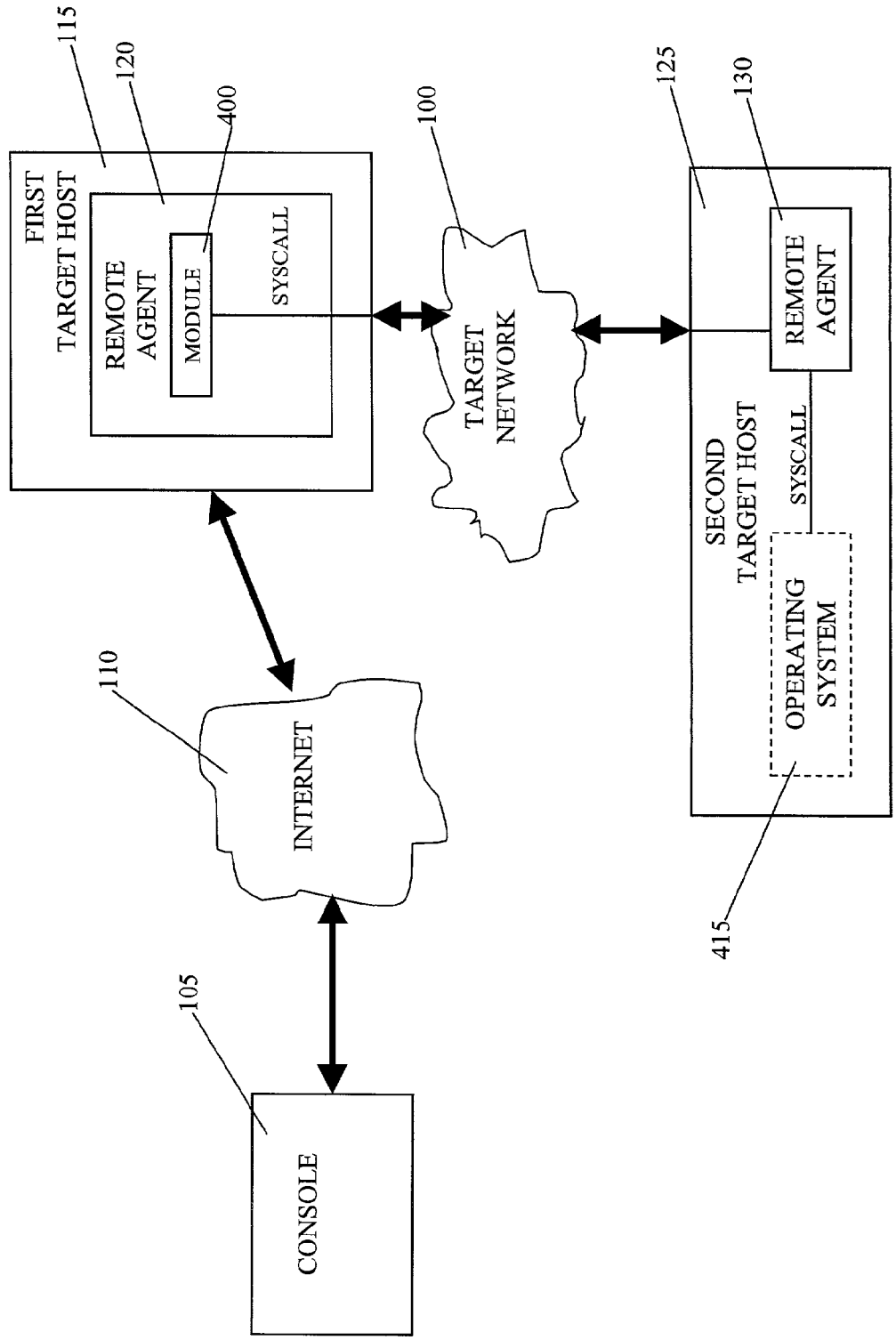
FIG. 13 is a block diagram of a configuration in which a module is executed by the remote agent in the first target host and system calls are executed in the operating system of the second target host.

Another configuration in which a module is executed by a remote agent in a target host is shown in FIG. 13. In this configuration, however, the system calls generated by the module 400 are transmitted to a remote agent 130 installed in another target host, e.g., the second target host 125. System calls generated by the module 400 are handled by the syscall proxy server of the remote agent 130 and are executed in the operating system 415 of the second target host 125.

As above, this configuration allows the module to take advantage of the resources of the first target host 115, and enables the module to run without generating network traffic between the console 105 and the target network 100. Another advantage of this configuration is that, from the perspective of the other hosts in the target network 100, the module 400 commands appear to originate from the second target host 125. Consequently, such commands are more likely to be trusted and implemented by the other hosts of the target network. In other words, using the remote agent 130, the system effectively assumes the identity of the compromised host and takes advantage of the privileges of the compromised host within the target network.

Figure 14:
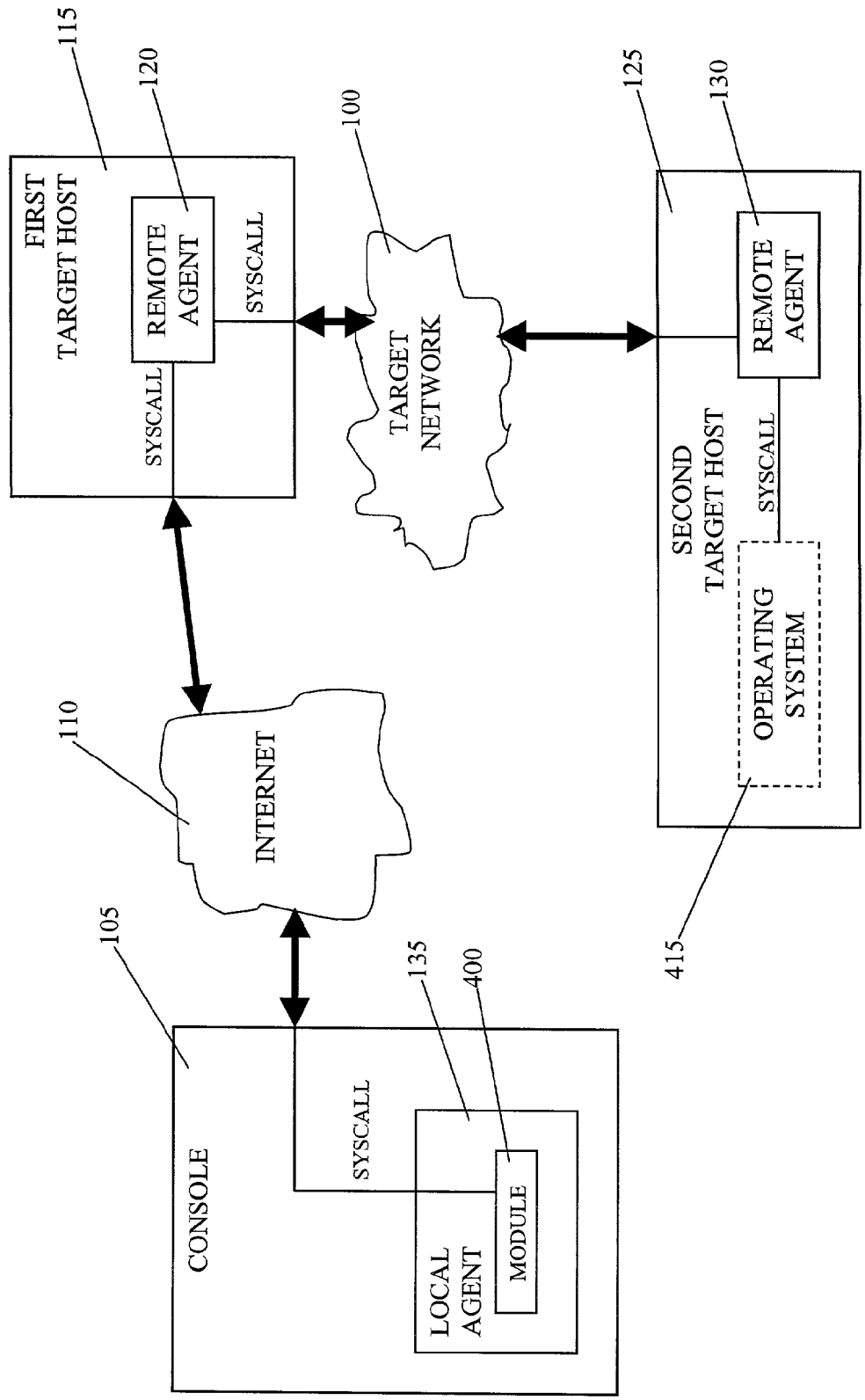
FIG. 14 is a block diagram of a configuration in which a module is executed by the local agent in the console and system calls are executed in the operating system of the second target host.

FIG. 14 shows another configuration in which a module is executed by the local agent in the console. In this configuration, however, system calls generated by the module 400 are transmitted to a remote agent 120 installed in the first target host 115, which in turn passes the system calls to a remote agent 130 installed in the second target host 125. The system calls are handled by the syscall proxy server of the remote agent 130 in the second target host 125 and are executed in the operating system 415 of the second target host 125. As in the case above, from the perspective of the other hosts in the target network, the module commands appear to originate from the second target host. Consequently, such commands are more likely to be trusted and implemented by the other hosts of the target network.

Figure 15:
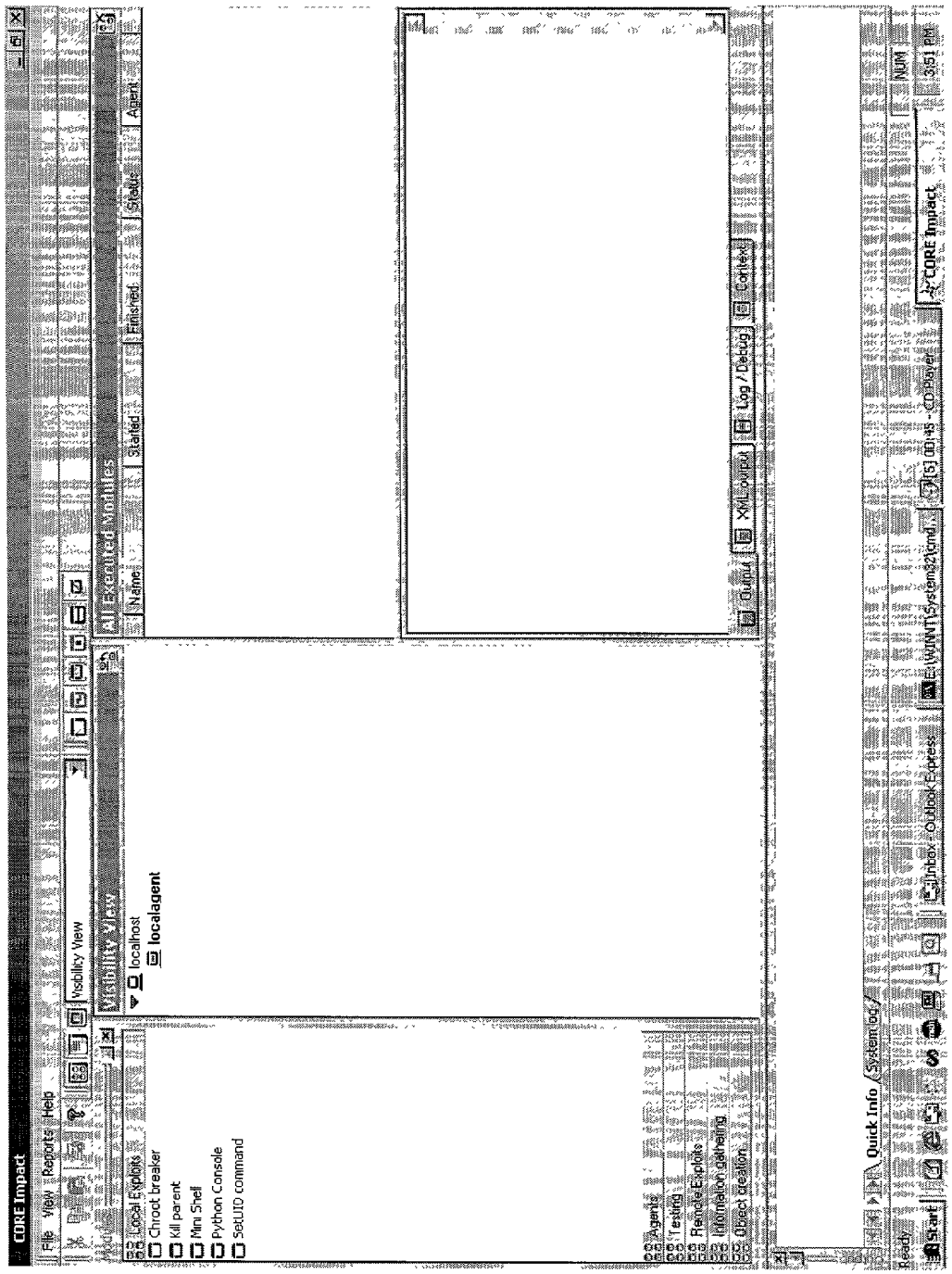
FIG. 15 is a basic graphical user interface display screen presented by the user interface of the console.

As discussed above, the local agent 135 in the console 105 provides a user interface 150. As shown in FIG. 15, the user interface presents to the user a Windows-based graphical user interface (GUI) screen. The screen has several component windows that present information in various formats and allow control to be executed over various aspects of the penetration testing. Of course, the components of the screen may be moved and sized based on the user's preferences.

The visibility view, in the central portion of the screen, presents a graphical representation, i.e., a model, of the target network. In this example, the graphical representation is in the form of a hierarchical listing of entities, i.e., a tree listing. Each entity represents a physical component of the target network, e.g., a host. Initially, the visibility view shows only two entities, the local host (e.g., the console) and the local agent that is running on the local host. As further discussed below, as each stage of the penetration testing is performed, the model of the target network is updated to reflect newly gained information.

Tabs are arranged on the left side of the screen to organize the available functions, modules, and tools offered by the program. Clicking on a tab causes it to move to the top of the window and display the available modules under that category. For example, the Remote Exploits tab provides various modules that may be run on the local agent to exploit security vulnerabilities in a target network without being located in the target network. An executed modules window is provided on the top right side of the screen to display a history of the modules that have been executed during the penetration testing and their status. A module output window is provided on the bottom right side of the screen to display the output of the modules.

Figure 16:
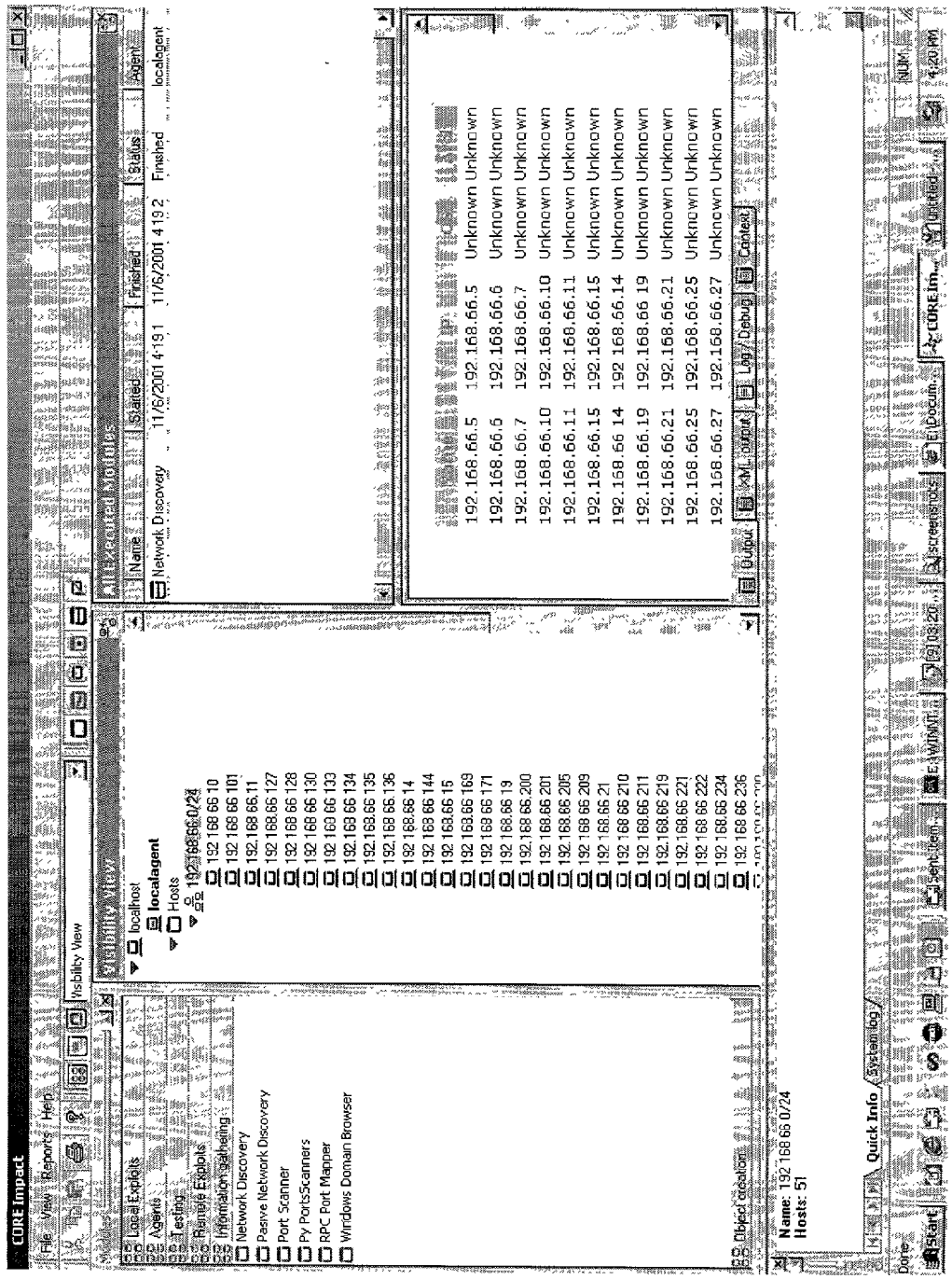
FIG. 16 is a display screen following the running a Network Discovery Module.

FIG. 16 shows an example of how the user interface screen appears after the Network Discovery module has been run. The Network Discovery module, which is grouped under the Information Gathering tab, is typically run early in the penetration testing to determine the topology of the target network. The executed modules window shows that the Network Discovery module has been run and provides the start and finish times and the current status, which in this case indicates that the execution of the module is finished. The module output window provides a table of host names, Internet protocol (IP) addresses, operating system (OS), and other information output by the module.

Following the execution of the Network Discovery module, the visibility view displays a graphical representation of the target network in the form of a tree listing. The tree shows that the local host on the console (local host) has a local agent that is connected to a first target host having IP address 192.168.66.0/24. The first target host, in turn, is connected to other hosts within the target network. The entities in the tree listing may be collapsed or expanded according to hierarchical level by clicking on the arrow symbols on the left-hand side of the entities. As each module is run during the penetration testing, the visibility view is automatically updated to show a more complete model of the target network.

Figure 17:
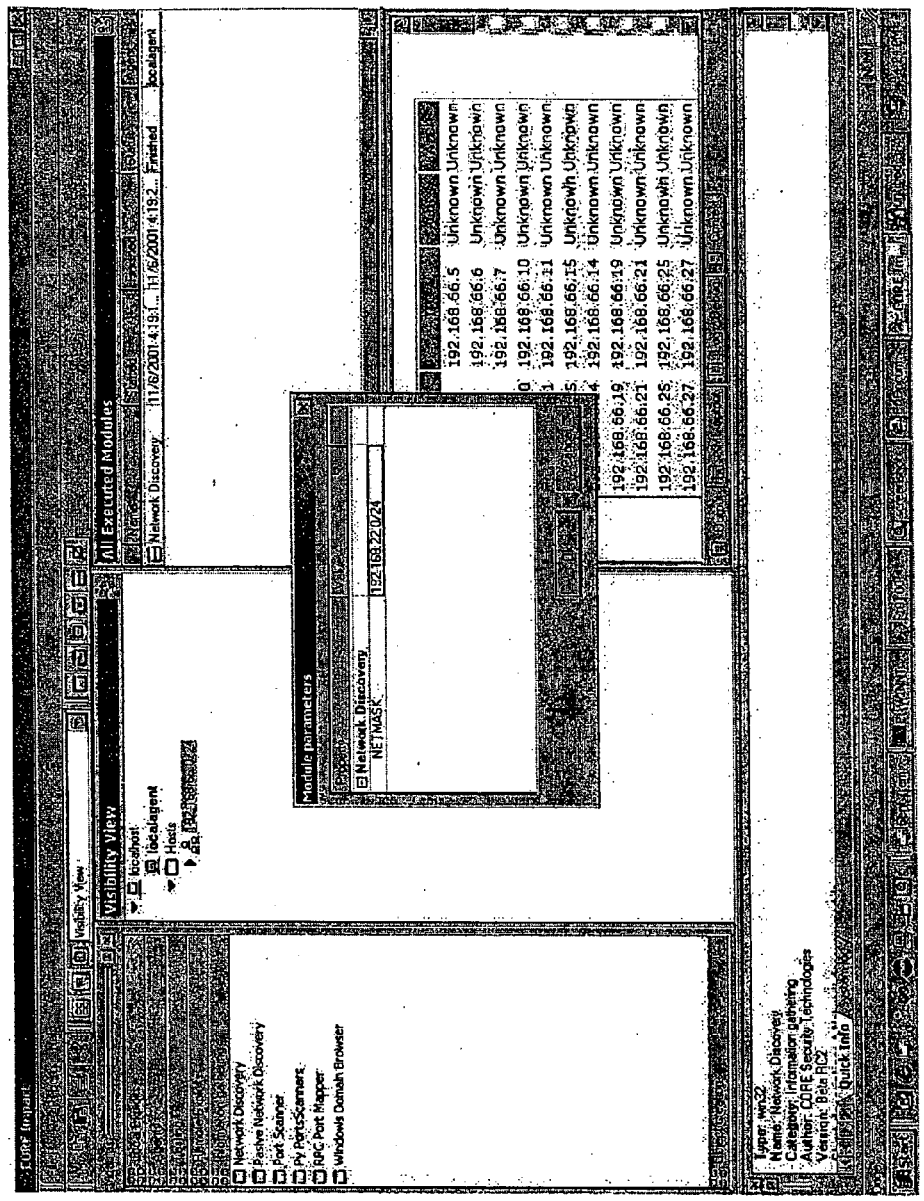
FIG. 17 is a display screen following initiation of the Network Discovery module for a second time.

FIG. 17 shows an example of the screen display for initiating the execution of the Network Discovery module for a second time. The user double clicks on the Network Discovery module tab, and the screen presents a module parameter entry box. The user is prompted to enter the IP address of the target network, which is typically known by the user prior to performing penetration testing. For instance, the user may determine the IP address from a domain name server lookup of the domain name of the target host. In this example, the Network Discovery module is targeting the host with IP address 192.168.22.0/24. In the visibility view, the previously targeted host (192.168.66.0/24) has been collapsed to a single top-level entry in the tree listing. As an alternative to entering the target host IP address, the module tab may be dragged and dropped onto the target host in the tree listing for which information is to be gathered.

As discussed above, modules may be run on local or remote agents in a variety of configurations. The system calls generated by the modules are executed on the default source host, which in the example of FIG. 17 is the local agent. The default source is either the most recently used source or a source selected in the visibility view prior to execution of the module. For instance, if a module is executed using the local agent as a source host, the local agent remains the default source until a new source is selected. Thus, double clicking on the Network Discovery tab results in that module being run with on the local agent and gathering information from the target host entered in the module parameter entry box.

Figure 18:
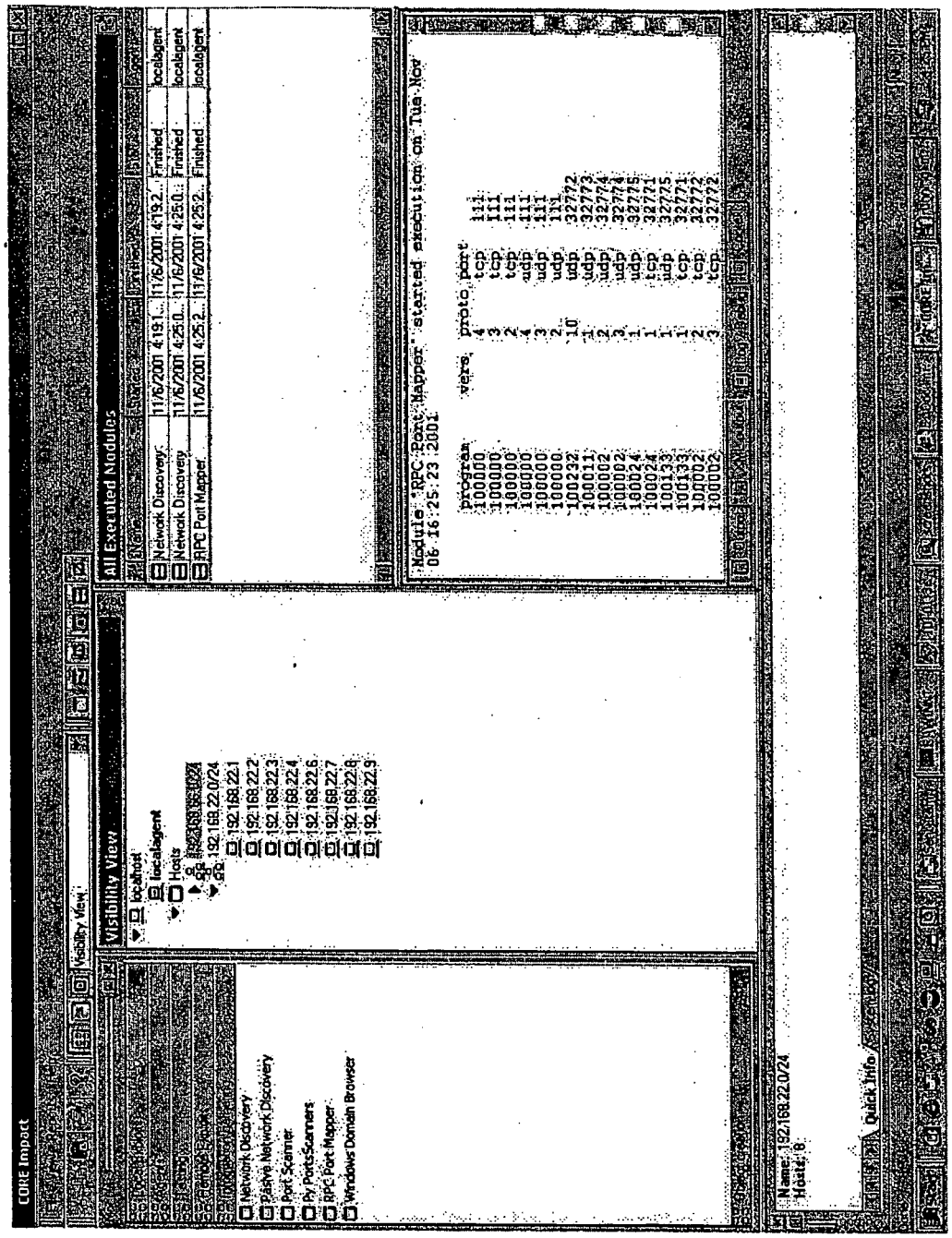
FIG. 18 is a display screen showing the results of the second running of the Network Discovery module and the running of the Remote Procedure Call (RPC) Mapper module.

As shown in FIG. 18, the output of the Network Discovery module is presented in the visibility view as a list of connected hosts under the target host (192.168.22.0/24). The executed module window indicates that the Network Discovery module has been run a second time. In addition, the Remote Procedure Call (RPC) Mapper module has been run, which attempts to identify all of the ports in the target host that are available to receive RPC commands. The RPC Mapper was initiated by dragging and dropping it onto the target host, which in this case is 192.168.22.2. The output of the RPC Mapper is shown in the module output window in the log/debug format, which includes information to enable the user to track and rectify errors in the module. The output identifies the RPC ports and their associated protocols.

Figure 19:
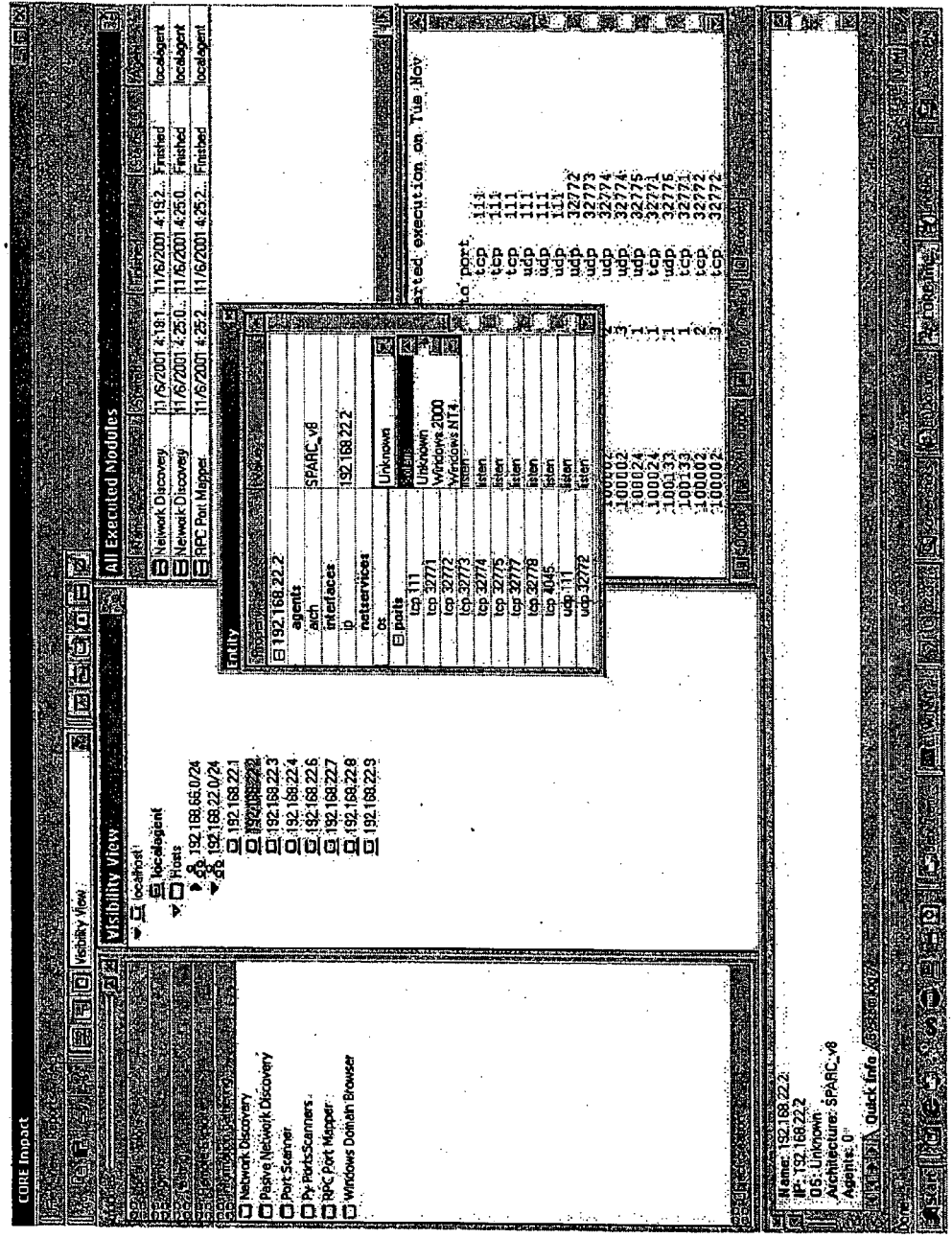
FIG. 19 is a display screen in which the entities in the model of the target network can be examined and modified using an entity editor.

As shown in FIG. 19, the entities in the model of the target network can be examined and modified using an entity editor. Each entity has properties that reflect aspects of the information gathered on the corresponding physical component in the target network. For example, a host entity has properties such as system architecture (arch), operating system, interfaces, ports, etc. The host entity also has an agent property that lists the agents running on that host.

The properties of each entity are updated automatically as modules are run during the penetration testing. For example, the entity corresponding to host 192.168.22.2 has a listing of ports available for RPC service. This listing is the result of running the RPC Mapper module directed toward this host, as described above. In certain instances, different modules may result in different property states, for example, two different results regarding the operating system being run on a particular host. In such a case, the program will prompt the user to resolve the apparent conflict based on experience or outside knowledge.

Even in the absence of a conflict, the state of these properties may be changed by the user based on experience and knowledge gained from other sources. For example, the user may know, based on experience, that a host having a particular architecture, e.g., Sparc Version 8, may run a particular operating system, e.g., Solaris. In such a case, the user edits the host entity and changes the operating system property from unknown to Solaris. This allows the user to build a more complete and accurate model of the target network.

Figure 20:
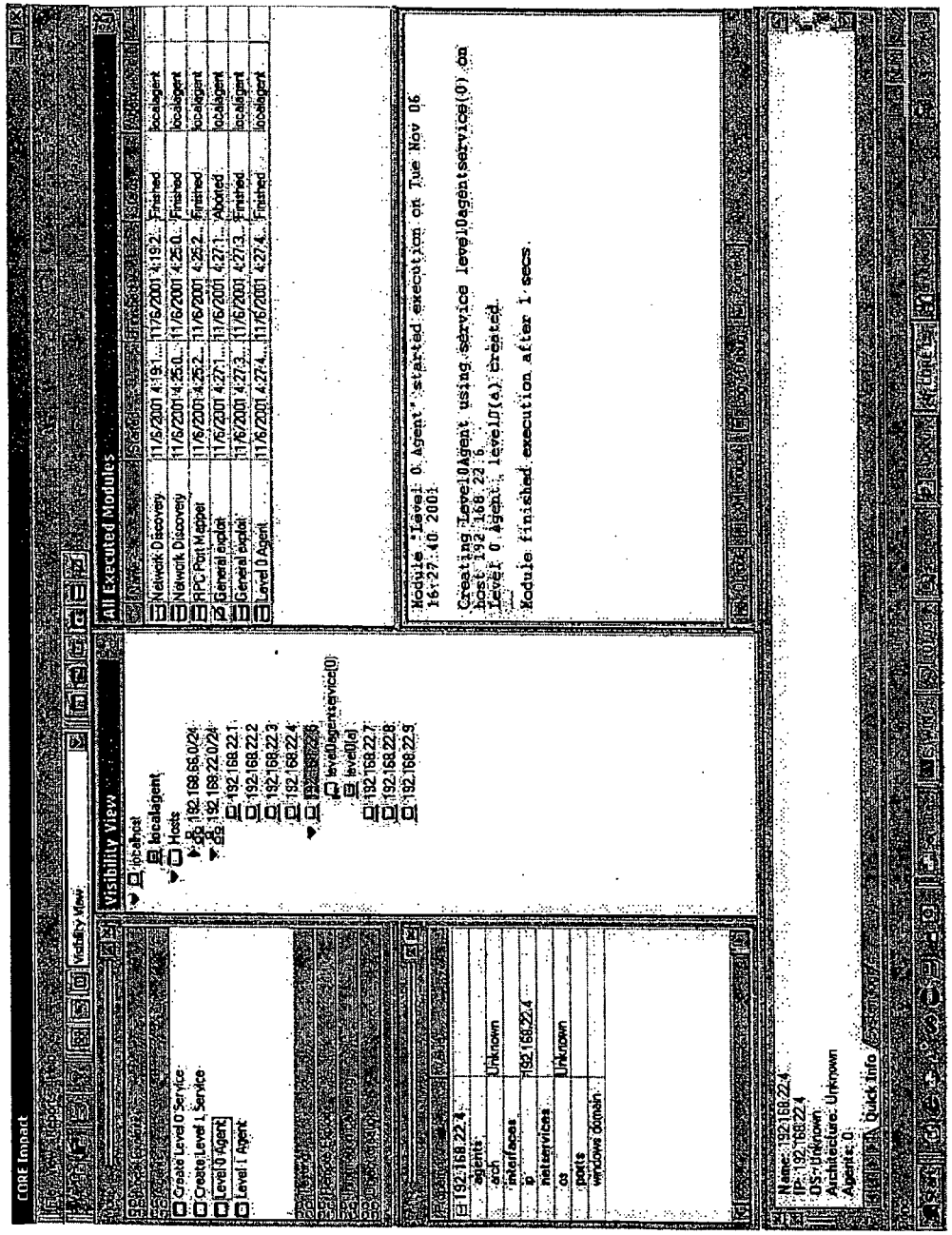
FIG. 20 is a display screen following two executions of the General Exploit module and the installation of a level 0 agent in a target host.

Once sufficient information has been gathered regarding the target network, modules may be executed to exploit security vulnerabilities in the target network. As shown in FIG. 20, such modules are grouped under the Local Exploits and Remote Exploits tabs on the user interface screen depending upon whether they run within the target host (i.e., locally) or remotely. In this example, the executed module window shows that a module called "General Exploit" has been run twice. The first execution of the module was unsuccessful, as indicated by the icon to the left of the module name and by the term "aborted" in the status column. The second execution was successfully completed. In addition to the modules grouped under the exploit tabs, there are a series of modules under the Agents tab that relate to the installation and execution of remote agents in the target network. In this example, a level 0 agent has been installed in the host with address 192.168.22.6.

The installation of the level 0 agent may be accomplished by clicking on two entries under the Agents tab. First, a level 0 agent service is initiated, which is a process that runs on the target host. As discussed above, the level 0 agent service may share the process space of an existing service on the target host, such as an email server. Then, a level 0 agent is installed and executed in the level 0 agent service. Alternatively, the program may present a single entry under the Agents tab that performs all of the steps required to install and execute the level 0 agent.

Figure 21:
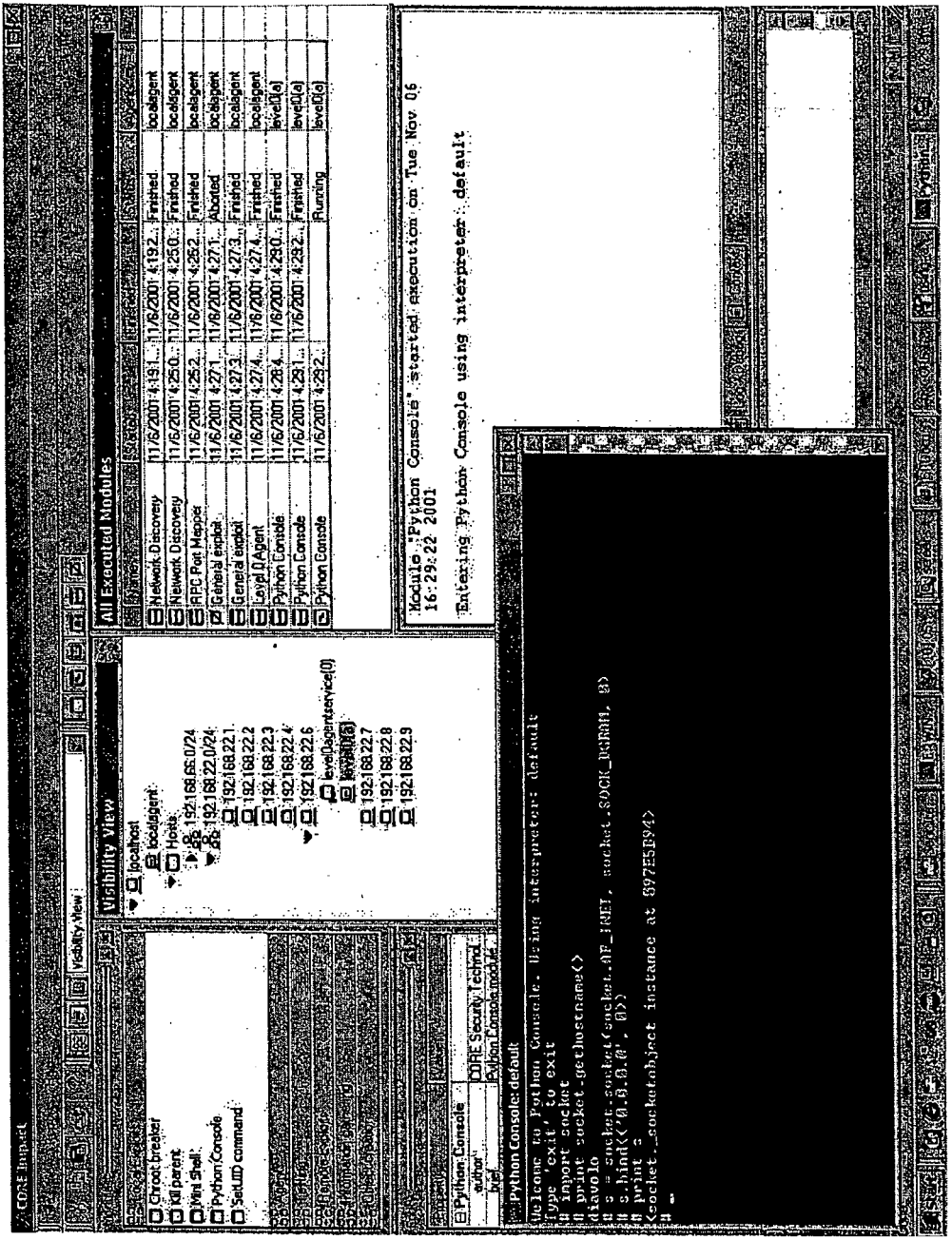
FIG. 21 is a display screen showing a window in which a Python console is running using the level 0 agent as a source.
Figure 22:
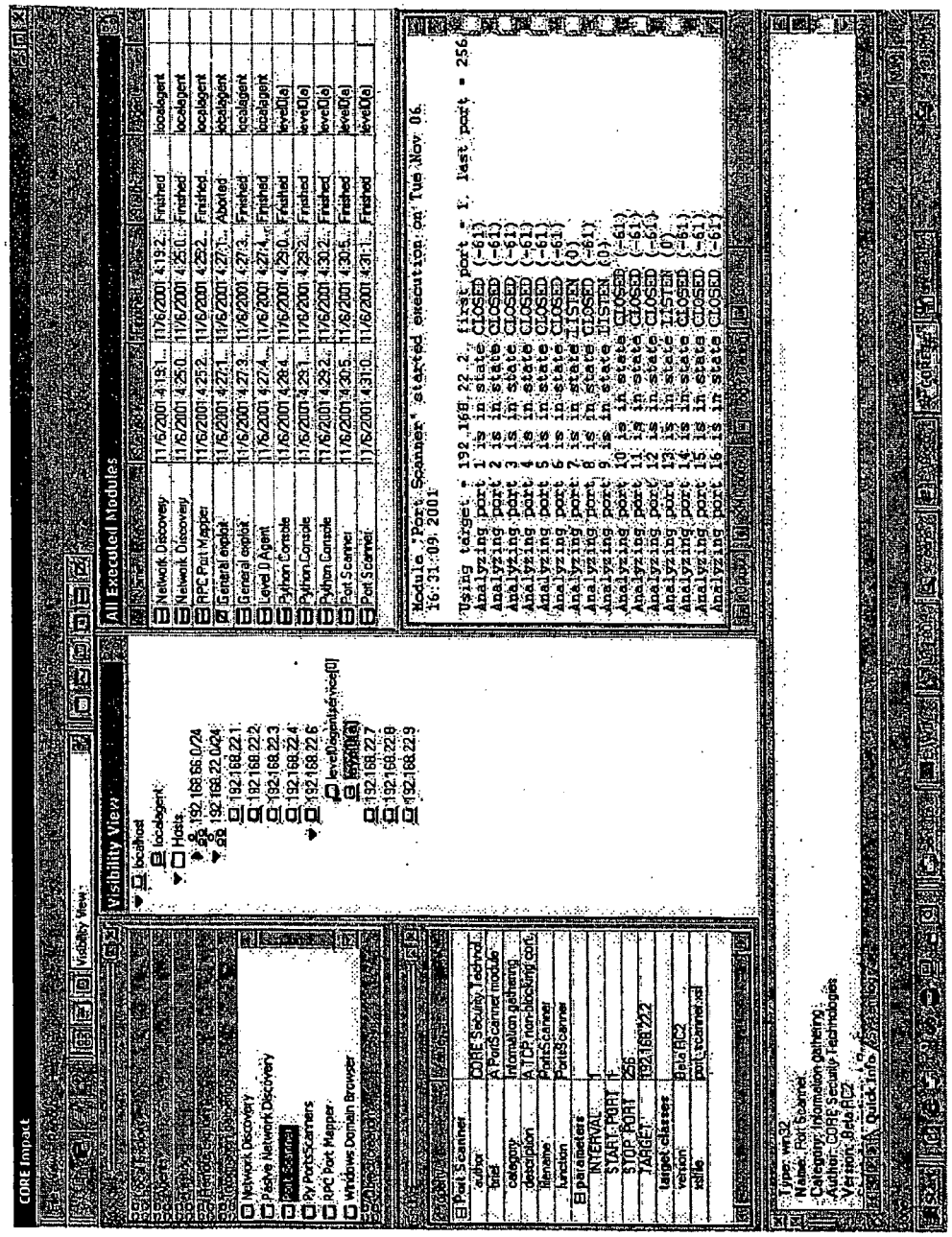
FIG. 22 is a display screen following the execution of a port scanning module using the level 0 agent as a source.

Once the level 0 agent has been installed, the user can begin to take advantage of the agent by executing modules on it. The user sets the level 0 agent to be the source for the execution of modules by right clicking on the agent and selecting "Set as source". As shown in FIG. 21, the level 0 agent may be displayed as highlighted or bold in the visibility view to indicate to the user that it is the current default source. All subsequent modules are run on the level 0 agent source until the default is changed.

In this example, the Python Console module has been initiated. As discussed above, Python is a high-level, platform-independent, scripting language. The Python console allows the user to enter and execute Python commands and to save commands as a module. The Python command interpreter runs on the local agent, however, the syscalls generated by the command interpreter are executed by the syscall proxy server of the level 0 agent, which is the selected source.

In contrast, a module may run on a remote agent that has the capability to execute modules, such as a level 2 agent. As discussed above, the level 2 agent has a virtual machine that enables it to execute scripting language modules. In such a case, the module is resident on and executes on the remote agent. Syscalls generated by the module are executed either as a native call on the remote host (see FIGS. 7 and 8) or by a syscall proxy server on a downstream agent. The module may be installed together with the remote agent, or may be downloaded after the remote agent has been installed. This capability for 100% remote execution is advantageous, because it allows the module to run without receiving a continuous series of commands, thereby avoiding the generation of excessive network traffic. Moreover, a module for exploiting a security vulnerability may have certain timing requirements that, due to network latency, cannot be met if commands must be received over the network.

Regardless of whether a module is being run on the local agent or a remote agent, the syscalls generated by the module will be executed on the selected source, which in the example of FIG. 21 is the level 0 agent installed on target host 192.168.22.6. Thus, the Python commands executed in the Python console generate syscalls that are executed on this selected target host. For example, the Python command "print socket.gethostname ( )", shown in the Python console window, generates a syscall to retrieve the name of the target host, "diavolo". The remaining commands shown in the window generate syscalls to create a socket in the target host, which can he be used to retrieve information from the target host.

It will be appreciated that each of these embodiments discussed above provides a novel system and method for analyzing computer system security by compromising the security in a systematic manner.

It also will be appreciated that because the system provides a database of modules for exploiting security vulnerabilities, the system described herein actually attempts to exploit detected vulnerabilities, rather than merely listing them.

It also will be appreciated that because the system provides a virtual machine to execute modules in agents installed in target hosts, the modules can be run on a variety of platforms and operating systems without further customization and testing. In addition, publicly available programs to exploit security vulnerabilities can be used without an extensive laboratory infrastructure for rewriting and testing.

It also will be appreciated that because the system maintains a database of all operations performed during the penetration testing, the target system can be reliably returned to its original configuration.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed:

1. An agent embodied in a computer-readable medium for use in a system for performing penetration testing of a target computer network having a target host, the agent comprising:

a system-calls proxy server configured to receive and execute, in the target host, system calls received via a network; and a virtual machine configured to execute, in the target host, scripting language instructions received via the network, wherein the system calls received via the network are routed to the system-calls proxy server and the scripting language instructions received via the network are routed to the virtual machine.

2. The agent of claim 1, further comprising an execution engine configured to control the system-calls proxy server and the virtual machine, wherein the system calls and the scripting language instructions are routed to the system-calls proxy server and the virtual machine, respectively, by the execution engine.

3. The agent of claim 2, further comprising a remote procedure call module configured to receive commands from the network formatted in a remote procedure call protocol and pass the commands to the execution engine.

4. An agent embodied in a computer-readable medium for use in a system for performing penetration testing of a target computer network, having a target host, the agent comprising:
- a system-calls proxy server configured to receive and execute, in the target host system calls received via a network;
- a virtual machine configured to execute, in the target host, scripting language instructions received via the network;
- a secure communication module configured to provide secure communication between the virtual machine and the network;
- an execution engine configured to control the system-calls proxy server and the virtual machine, wherein the system calls and the scripting language instructions are routed to the system-calls proxy server and the virtual machine, respectively, by the execution engine;
- a remote procedure call module configured to receive commands via the network formatted in a remote procedure call protocol and pass the commands to the execution engine; and
- a second secure communication module configured to provide secure communication between the remote procedure call module and the network.

5. A method for performing penetration testing of a target network, comprising the steps of:
- executing a first module to exploit a security vulnerability of a first target host of the target network;
- installing a first remote agent in the first target host as a result of exploiting the security vulnerability of the first target host;
- sending a system call to the first remote agent via a network; and
- executing the system call in the first target host using a system-calls proxy server of the first remote agent to exploit a security vulnerability of a second target host, wherein the system call comprises a computer instruction that is executed in an operating system of the first target host.

6. A method for performing penetration testing of a target network, comprising the steps of:
- executing a first module to exploit a security vulnerability of a first target host of the target network;
- installing a first remote agent in the first target host as a result of exploiting the security vulnerability of the first target host;
- executing in the first remote agent a second module that generates a system call; and
- executing the system call in the first target host to exploit a security vulnerability of a second target host, wherein the system call comprises a computer instruction that is executed in an operating system of the first target host.

7. A method for performing penetration testing of a target network, comprising the steps of:
- executing a first module to exploit a security vulnerability of a first target host of the target network;
- installing a first remote agent in the first target host as a result of exploiting the security vulnerability of the first target host;
- executing a second module in the first remote agent that generates a system call;
- installing a second remote agent in a second target host as a result of exploiting a security vulnerability of the second target host;
- sending the system call generated by the second module to the second remote agent via a network; and
- executing the system call in the second target host using a system-calls proxy server of the second remote agent, wherein the system call comprises a computer instruction that is executed in an operating system of the second target host.

8. A method for performing penetration testing of a target network, comprising the steps of:
- executing a first module to exploit a security vulnerability of a first target host of the target network;
- installing a first remote agent in thefirst target host as a result of exploiting the security vulnerability of the first target host;
- installing a second remote agent in the second target host as a result of exploiting a security vulnerability of the second target host;
- sending a system call to the first remote agent;
- sending the system call from the first remote agent to the second remote agent; and
- executing the system call in the second target host using a system-calls proxy server of the second remote agent, wherein the system call comprises a. computer instruction that is executed in an operating system of the second target host.

9. A method for performing penetration testing of a target network, comprising the steps of:
- installing a first remote agent in a first target host of the target network, the first remote agent having a system-calls proxy server configured to receive and execute system calls;
- executing in the first remote agent a system call received via a network, the system call comprising a computer instruction that is executed in an operating system of the first target host;
- installing a second remote agent in the first target host, the second remote agent having a system-calls proxy server configured to receive and execute system calls and a virtual machine configured to execute scripting language instructions; and
- executing in the second remote agent a scripting language instruction or a system call received via the network.

10. Computer code embodied in a computer readable medium for performing penetration testing of a target network, the code comprising code for:
- executing a first module to exploit a security vulnerability of a first target host of the target network;
- installing a first remote agent in the first target host as a result of exploiting the security vulnerability of the first target host;
- sending a system call to the first remote agent via a network; and
- executing the system call in the first target host using a system-calls proxy server of the first remote agent to exploit a security vulnerability of a second target host, the system call comprising a computer instruction that is executed in an operating system of the first target host.

11. Computer code embodied in a computer readable medium for performing penetration testing of a target network, the code comprising code for:
- executing a first module to exploit a security vulnerability of a first target host of the target network;

installing a first remote agent in the first target host as a result of exploiting the security vulnerability of the first target host;

executing in the first remote agent a second module that generates a system call; and executing the system call in the first target host to exploit a security vulnerability of a second target host, the system call comprising a computer instruction that is executed in an operating system of the first target host.

12. Computer code embodied in a computer readable medium for performing penetration testing of a target network, the code comprising code for:

executing a first module to exploit a security vulnerability of a first target host of the target network;

installing a first remote agent in the first target host as a result of exploiting the security vulnerability of the first target host;

executing a second module in the first remote agent that generates a system call;

installing a second remote agent in the second target host as a result of exploiting a security vulnerability of the second target host;

sending the system call generated by the second module to the second remote agent via a network; and executing the system call in the second target host using a system-calls proxy server of the second remote agent, the system call comprising a computer instruction that is executed in an operating system of the second target host.

13. Computer code embodied in a computer readable medium for performing penetration testing of a target network, the code comprising code for:

executing a first module to exploit a security vulnerability of a first target host of the target network;

installing a first remote agent in the first target host as a result of exploiting the security vulnerability of the first target host;

installing a second remote agent in the second target host as a result of exploiting a security vulnerability of the second target host;

sending a system call to the first remote agent;

sending the system call from the first remote agent to the second remote agent; and executing the system call in the second target host using a system-calls proxy server of the second remote agent, the system call comprising a computer instruction that is executed in an operating system of the second target host.

14. Computer code embodied in a computer readable medium for performing penetration testing of a target network, the code comprising code for:

installing a first remote agent in the first target host, the first remote agent having a system-calls proxy server configured to receive and execute system calls;

executing in the first remote agent a system call received via a network, the system call comprising a computer instruction that is executed in an operating system of the first target host;

installing a second remote agent in the first target host, the second remote agent having a system-calls proxy server configured to receive and execute system calls and a virtual machine configured to execute scripting language instructions; and executing in the second remote agent a scripting language instruction or a system call received via the network.

* * * * *